(12) United States Patent
He et al.

(10) Patent No.: US 12,432,139 B2
(45) Date of Patent: Sep. 30, 2025

(54) PACKET PROCESSING METHOD, NETWORK DEVICE, AND NETWORK SYSTEM

(71) Applicant: HUAWEI TECHNOLOGIES CO., LTD., Shenzhen (CN)

(72) Inventors: Hongwei He, Nanjing (CN); Cheng Sheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 18/614,229

(22) Filed: Mar. 22, 2024

(65) Prior Publication Data
US 2024/0235994 A1 Jul. 11, 2024

Related U.S. Application Data

(63) Continuation of application No. PCT/CN2022/119639, filed on Sep. 19, 2022.

(30) Foreign Application Priority Data

Sep. 23, 2021 (CN) .......................... 202111115406.0

(51) Int. Cl.
H04L 12/66 (2006.01)
H04L 45/00 (2022.01)
(Continued)

(52) U.S. Cl.
CPC ............ H04L 45/566 (2013.01); H04L 45/04 (2013.01); H04L 45/741 (2013.01)

(58) Field of Classification Search
CPC ..... H04L 45/566; H04L 45/04; H04L 45/741; H04L 12/66
(Continued)

(56) References Cited

U.S. PATENT DOCUMENTS 7,068,598 B1 * 6/2006 Bryson ............... H04L 65/1069
370/230
2004/0208165 A1 * 10/2004 Cai ...................... H04L 65/1083
370/352
(Continued)

FOREIGN PATENT DOCUMENTS

| CN | 105589506 A | 5/2016 |
| EP | 3751799 A1 | 12/2020 |
| WO | 2021180077 A1 | 9/2021 |

OTHER PUBLICATIONS

Dunbar et al., "BGP Update for SDWAN Edge Discovery draft-dunbar-idr-sdwan-edge-discovery-04," total 29 pages (Mar. 7, 2021).
(Continued)

Primary Examiner — Jude Jean Gilles
(74) Attorney, Agent, or Firm — Leydig, Voit & Mayer, Ltd.

(57) ABSTRACT

A packet processing method, a network device, and a network system are provided, which are related to the field of communication technologies. According to the method, an intermediate node updates a source IP address of a packet based on an IP address that belongs to a local end in an endpoint IP address of a connection, and updates a destination IP address of the packet based on an IP address that belongs to a remote end in the endpoint IP address of the connection. Therefore, in a scenario in which an SR path crosses underlay transport networks in a plurality of different routing domains, a problem that a packet is discarded because a source IP address is always an IP address of a head end and URPF check fails is avoided.

20 Claims, 19 Drawing Sheets

(51) Int. Cl.
*H04L 45/02* (2022.01)
*H04L 45/741* (2022.01)

(58) Field of Classification Search
USPC .......................................................... 709/238
See application file for complete search history.

(56) References Cited

U.S. PATENT DOCUMENTS

2007/0201481 A1* 8/2007 Bhatia .................... H04L 65/80
370/395.2
2011/0216651 A1* 9/2011 Bansal ................. H04L 69/326
370/235

OTHER PUBLICATIONS

Gredler et al., "North-Bound Distribution of Link-State and Traffic Engineering (TE) Information Using BGP," rfc7752, total 48 pages (Mar. 2016).
Ginsberg et al., "BGP-Link State (BGP-LS) Advertisement of IGP Traffic Engineering Performance Metric Extensions," rfc8571, total 10 pages (Mar. 2019).
Filsfils et al., "Segment Routing over IPv6 (SRv6) Network Programming," RFC 8986, total 40 pages (Feb. 2021).
Previdi et al., "Advertising Segment Routing Policies in BGP draft-ietf-idr-segment-routing-te-policy-13," total 44 pages (Jun. 7, 2021).
Geng et al., "DetNet SRv6 Data Plane Encapsulation; draft-geng-detnet-dp-sol-srv6- 00," Network Working Group, Internet Engineering Task Force, IETF; Standardworkingdraft, Internet Society (ISOC), XP015131754, Total 16 pages (Mar. 11, 2019).

* cited by examiner

PACKET PROCESSING METHOD, NETWORK DEVICE, AND NETWORK SYSTEM

CROSS-REFERENCE TO RELATED APPLICATIONS

This application is a continuation of International Application No. PCT/CN2022/119639, filed on Sep. 19, 2022, which claims priority to Chinese Patent Application No. 202111115406.0, filed on Sep. 23, 2021. The disclosures of the aforementioned applications are hereby incorporated by reference in their entireties.

TECHNICAL FIELD

Embodiments of this application relate to the field of communication technologies, and in particular, to a packet processing method, a network device, and a network system.

BACKGROUND

Segment routing (SR) is a protocol designed based on a concept of source routing to forward a packet in a network. The SR divides a network path into segments, and assigns segment identifiers (segment ID, SID) to these segments and forwarding nodes in the network. Segments and network nodes are arranged in order to obtain a segment list, so that a forwarding path can be indicated by using the segment list.

Currently, a basic procedure of forwarding a packet based on the SR technology is as follows: After a head end device in an SR path receives an original packet sent by a source host, the head end device encapsulates the original packet as an SR packet, and sends the SR packet to a next-hop node in the SR path. A source IP address of the SR packet is an internet protocol (IP) address of the head end. A destination IP address of the SR packet is a SID of the next-hop node. The SR packet includes a SID of each node in the SR path. After an intermediate node through which the SR path passes receives the SR packet, the intermediate node keeps the source IP address of the SR packet unchanged, updates the destination IP address of the SR packet to a SID of a next-hop node, and then forwards the SR packet to the next-hop node. When the SR packet is forwarded to a tail end, the tail end decapsulates the SR packet as the original packet, and sends the original packet to a destination host.

If the SR path needs to cross underlay networks in a plurality of different routing domains, a packet may be discarded due to a unicast reverse path forwarding (URPF) check failure.

SUMMARY

Embodiments of this application provide a packet processing method, a network device, and a network system, to avoid a problem that a packet is discarded because URPF check fails. Technical solutions are as follows:

According to a first aspect, a packet processing method is provided. Optionally, the method is performed by a network device that acts as an intermediate node in an SR path. For example, a first network device acts as the intermediate node. The method includes: The first network device receives a first packet from a second network device, where an IP address of the first packet includes an endpoint IP address of a first connection, the first packet includes a SID, the SID indicates a second connection, the first connection is a connection from the second network device to the first network device, and the second connection is a connection from the first network device to a third network device. The first network device processes the first packet to obtain a second packet, where a source IP address of the second packet is an IP address that belongs to the first network device in an endpoint IP address of the second connection, and a destination IP address of the second packet is an IP address that belongs to the third network device in the endpoint IP address of the second connection. The first network device sends the second packet to the third network device.

According to the foregoing method, the intermediate node updates a source IP address of a packet based on an IP address that belongs to a local end in an endpoint IP address of a connection, and updates a destination IP address of the packet based on an IP address that belongs to a remote end in the endpoint IP address of the connection. Therefore, in a scenario in which an SR path crosses underlay transport networks in a plurality of different routing domains, a problem that a packet is discarded because a source IP address is always an IP address of a head end and URPF check fails is avoided. In addition, the endpoint IP address of the connection is different from an IP address named a SID, the endpoint IP address of the connection is usually an IP address of a WAN interface of a network device, the endpoint IP address of the connection is usually an IP address assigned by an operator of the underlay transport network, the underlay transport network can naturally ensure route reachability of the IP address, and an underlay network device does not need to run an IGP routing protocol that supports SR to learn segment routing corresponding to the SID to ensure route reachability of the IP address. Therefore, establishment of a forwarding path does not need to depend on the routing protocol of the underlay transport network.

Optionally, the first connection and/or the second connection each are/is a tunnel virtual connection (TVC). The TVC is usually different from a physical link, and the TVC is a logical virtual connection. One TVC usually passes through one or more underlay transport networks. For example, the first connection passes through a first underlay network, and the second connection passes through a second underlay network.

Optionally, the endpoint IP address of the first connection and/or the endpoint IP address of the second connection each are/is an IP address that is of a wide area network WAN interface and that is assigned by an operator of an underlay network.

Because the IP address of the WAN interface is assigned by the operator of the underlay network, the operator of the underlay network is responsible for ensuring route reachability of the IP address, and a network device does not need to advertise a route including the IP address to a device in the underlay network by using a routing protocol, to get rid of dependency on the routing protocol of the underlay network, thereby saving overheads brought by route advertisement.

Optionally, the endpoint IP address of the first connection and/or the endpoint IP address of the second connection each are/is a public-network IP address.

Optionally, the first connection and/or the second connection each are/is a connection between different sites. For example, the second network device is deployed in a first site, the first network device is deployed in a second site, and the third network device is deployed in a third site. The first connection is a connection from the first site to the second site, and the second connection is a connection from the second site to the third site.

In the foregoing implementation, a forwarding path can be established between a plurality of sites, so that more flexible traffic planning can be performed.

Optionally, the endpoint IP address of the first connection is an internet protocol version 6 IPv6 address, the first packet includes a segment routing header SRH, and the SID is located in the SRH of the first packet. The first packet includes an IPv6 header, the IPv6 header is encapsulated in an outer layer of an original packet, and the endpoint IP address of the first connection is located in the IPv6 header of the first packet.

Optionally, the endpoint IP address of the second connection is an IPv6 address. The second packet includes an IPv6 header, the IPv6 header is encapsulated in an outer layer of an original packet, and the endpoint IP address of the second connection is located in the IPv6 header of the second packet.

In the foregoing implementation, because a packet is transmitted between two connected endpoints based on an IPv6 address, and an SRH is encapsulated in the packet, construction of an SD-WAN SR tunnel in an IPv6 transport network is supported.

Optionally, the endpoint IP address of the first connection is an internet protocol version 4 IPv4 address, the first packet includes an SRH, and the SID is located in the SRH of the first packet. The first packet includes an IPv4 header, the IPv4 header is encapsulated in an outer layer of an original packet, and the endpoint IP address of the first connection is located in the IPv4 header of the first packet.

Optionally, the endpoint IP address of the second connection is an IPv4 address. The second packet includes an IPv4 header, the IPv4 header is encapsulated in an outer layer of an original packet, and the endpoint IP address of the second connection is located in the IPv4 header of the second packet.

In the foregoing implementation, because a packet is transmitted between two connected endpoints based on an IPv4 address, construction of an SD-WAN SR tunnel in an IPv4 transport network is supported.

Optionally, the first packet includes a protocol type corresponding to the SRH.

Optionally, the first packet includes a GRE header, the GRE header is encapsulated in an outer layer of the SRH, and the protocol type corresponding to the SRH is located in the GRE header of the first packet.

Optionally, the first packet includes a VXLAN header, the VXLAN header is encapsulated in an outer layer of the SRH, and the protocol type corresponding to the SRH is located in the VXLAN header of the first packet.

Optionally, the protocol type corresponding to the SRH is located in the IPv4 header of the first packet.

In the foregoing implementation, because the protocol type corresponding to the SRH is included in the packet before the SRH, it is convenient for the intermediate node to identify the SRH based on the protocol type, and further perform processing based on the SID in the SRH, so that implementation complexity is reduced.

Optionally, the method provided in the first aspect further includes a process of reporting an endpoint IP address before a traffic forwarding phase. In a possible implementation, a network device acting as a source end reports an endpoint IP address of a connection to a controller device. For example, the second network device sends the endpoint IP address of the first connection to the controller device, and the first network device sends the endpoint IP address of the second connection to the controller device. In another possible implementation, a network device acting as a destination end reports an endpoint IP address of a connection to a controller device. For example, the first network device sends the endpoint IP address of the first connection to the controller device, and the third network device sends the endpoint IP address of the second connection to the controller device. In another possible implementation, a network device acting as a source end and a network device acting as a destination end each report an endpoint IP address of a connection to a controller device, and the controller device selects an IP address from endpoint IP addresses of connections that are reported by the two network devices. For example, the second network device sends the endpoint IP address of the first connection to the controller device, the first network device sends the endpoint IP address of the second connection and the endpoint IP address of the first connection to the controller device, and the third network device sends the endpoint IP address of the second connection to the controller device. After receiving the endpoint IP address of the first connection that is sent by the second network device and the endpoint IP address of the first connection that is sent by the first network device, the controller device selects one of the two endpoint IP addresses of the first connection for path computation. After receiving the endpoint IP address of the second connection that is sent by the first network device and the endpoint IP address of the second connection that is sent by the third network device, the controller device selects one of the two endpoint IP addresses of the second connection for path computation.

In the foregoing implementation, the controller device is supported in perceiving an endpoint IP address of each connection in a network, so that the controller device is assisted in orchestrating an SR path including a plurality of connections, thereby reducing a difficulty in path computation by the controller.

Optionally, the process of reporting an endpoint IP address of a connection includes: The first network device generates a border gateway protocol link-state (BGP LS) packet, where the BGP-LS packet includes the endpoint IP address of the second connection and/or the endpoint IP address of the first connection, and the BGP-LS packet further includes an identifier of an SD-WAN protocol. The first network device sends the BGP-LS packet to the controller device.

Because a new protocol identifier is extended from a BGP-LS protocol, when receiving the BGP-LS packet, the controller device can identify, by using the protocol identifier, that data reported by a network device is topology data of an SD-WAN.

Optionally, before the first network device receives the first packet from the second network device, the first network device further obtains an identifier of a site in which the first network device is located, and sends the identifier of the site in which the first network device is located to the controller device.

Because a network device reports an identifier of a site in which the network device is located to the controller device, the controller device performs path computation by using the site as an object.

Optionally, before the first network device receives the first packet from the second network device, the first network device further detects a connectivity status of the first connection and/or a connectivity status of the second connection, and sends the connectivity status of the first connection and/or the connectivity status of the second connection to the controller device. In a possible implementation, the first network device periodically sends the connectivity status of the first connection and/or the connectivity status of the second connection to the controller device. In a possible implementation, when the connectivity status of the first connection is updated, the first network device sends the connectivity status of the first connection to the controller device. In a possible implementation, when the connectivity status of the second connection is updated, the first network device sends the connectivity status of the second connection to the controller device.

Because a network device reports a connectivity status of a connection to the controller device, the controller device can perceive a status of each connection in an SR path in a timely manner, so that end-to-end path status perception is implemented. If the controller finds a fault on a connection in an SR path, the controller device may import traffic into another SR path by making the SR path ineffective, withdrawing the SR path, or re-computing the SR path, to prevent traffic from being discarded during forwarding.

Optionally, before the first network device receives the first packet from the second network device, the method further includes: the first network device sends service-level agreement (SLA) information of the first connection and/or the second connection. The SLA information includes but is not limited to at least one of a packet loss rate, a delay, jitter, or bandwidth utilization.

Because a network device reports SLA information of a connection to the controller device, the controller device can perceive an SLA of each connection in an SR path in a timely manner, and compute a path whose SLA meets a service requirement.

Optionally, the controller device assigns a SID to the second connection. The controller device sends the SID to the first network device. The first network device receives the SID from the controller device.

The controller device assigns a SID to a connection, so that it is ensured that a same SID is used to indicate a same connection to two endpoints of the connection, thereby avoiding a SID conflict.

According to a second aspect, a packet processing method is provided. Optionally, the method is performed by a network device that acts as a head end in an SR path. For example, a second network device acts as the head end. The method includes: The second network device receives an original packet. The second network device generates a first packet based on the original packet. A source IP address of the first packet is an IP address that belongs to the second network device in an endpoint IP address of a first connection. A destination IP address of the first packet is an IP address that belongs to a first network device in the endpoint IP address of the first connection. The first connection is a connection from the second network device to the first network device. The first packet includes a first SID. The first SID indicates a second connection. The second connection is a connection from the first network device to a third network device. The second network device sends the first packet to the first network device.

Optionally, the first connection and/or the second connection each are/is a TVC. The first connection and/or the second connection each are/is a connection between different sites.

According to the foregoing method, because the head end uses an endpoint IP address of a TVC as an IP address of a packet, and adds a SID indicating a next TVC to the packet, the packet can be forwarded to a next site through routing by using the endpoint IP address, and the SID is used to indicate an intermediate node to forward the packet to a site after the next site, so that a problem that a packet cannot pass through a plurality of specified sites in an SD-WAN scenario is resolved.

Optionally, before the second network device receives the original packet, the second network device receives an SR policy sent by a controller device. The SR policy includes the first SID. The second network device obtains the first SID from the SR policy.

Optionally, the SR policy further includes a second SID, and the second SID indicates the first connection.

Optionally, the first packet includes an IP header encapsulated in an outer layer of the original packet and an SRH. The endpoint IP address of the first connection is located in the IP header of the first packet. The first SID is located in the IP header of the first packet.

Optionally, the first packet includes a protocol type corresponding to the SRH.

Optionally, the first packet includes a GRE header, the GRE header is encapsulated in an outer layer of the SRH, and the protocol type corresponding to the SRH is located in the GRE header of the first packet.

Optionally, the first packet includes a VXLAN header, the VXLAN header is encapsulated in an outer layer of the SRH, and the protocol type corresponding to the SRH is located in the VXLAN header of the first packet.

Optionally, the protocol type corresponding to the SRH is located in an IPv4 header of the first packet.

According to a third aspect, a path determining method is provided. In the method, a controller device obtains endpoint IP addresses of a plurality of connections. The controller device determines a segment routing SR path based on the endpoint IP addresses of the plurality of connections, where the SR path includes a first connection and a second connection in the plurality of connections, the first connection is a connection from a first network device to a second network device, and the second connection is a connection from the second network device to a third network device. The controller device sends an SR policy to the first network device, where the SR policy indicates the SR path.

According to the foregoing method, the controller device orchestrates, by using the endpoint IP addresses of the plurality of connections, the SR path including the plurality of connections, and delivers, to a head end of the SR path, the SR policy indicating the SR path, so that the head end forwards a packet based on the SR policy. The method helps establish, across a plurality of sites, an end-to-end path that can be orchestrated, facilitating traffic planning.

Optionally, each of the plurality of connections is a connection between different sites, and a process in which the controller device determines the SR path includes: The controller device determines the SR path based on the endpoint IP addresses of the plurality of connections by using sites as path orchestration objects.

Optionally, the process in which the controller device determines the SR path includes: The controller device selects a target connection from connections established by different network devices in a same site, and determines the SR path based on the target connection. For example, a network includes a site 1 and a site 2, the site 1 includes a network device a and a network device b, and the site 2 includes a network device c and a network device d. The controller device determines, based on endpoint IP addresses of connections that are reported by the network device, that the network includes four connections. The four connections are a connection from the network device a to the network device c, a connection from the network device a to the network device d, a connection from the network device b to the network device c, and a connection from the network device b to the network device d. The controller device selects a target connection from the four connections based on a specified constraint, and determines an SR path based on the target connection.

In a possible implementation, the constraint is an SLA requirement. The controller device selects, as the target connection based on SLA information of the connections that is sent by the network device, a connection whose SLA information meets the SLA requirement from a plurality of connections of a same site. The SLA requirement includes but is not limited to requirements that a delay is less than specified duration, a packet loss rate is less than a specified packet loss rate, jitter is less than a specified value, bandwidth utilization is greater than specified bandwidth utilization, and the like.

Optionally, that a controller device obtains endpoint IP addresses of a plurality of connections includes: The controller device receives an endpoint IP address of the first connection that is sent by the first network device or the second network device.

Optionally, the SR policy includes a first SID, and the first SID indicates the second connection.

Optionally, the SR policy further includes a second SID, and the second SID indicates the first connection.

Optionally, the method further includes: The controller device assigns the first SID to the second connection, and assigns the second SID to the first connection. The first SID indicates the second connection, and the second SID indicates the first connection. The controller device sends the first SID to the second network device, and sends the second SID to the first network device.

The controller device collects an endpoint IP address of each connection, assigns a corresponding SID to each connection, and delivers the SID to a network device that needs the SID, so that in a traffic forwarding phase, the network device can send, based on a SID carried in a packet, the packet by using a connection corresponding to the SID, thereby flexibly controlling a forwarding path of the packet by using the SID.

According to a fourth aspect, a network device is provided. The network device has a function of implementing the first network device in any one of the first aspect or the optional manners of the first aspect. The network device includes at least one unit, and the at least one unit is configured to implement the method provided in any one of the first aspect or the optional manners of the first aspect. Alternatively, the network device has a function of implementing the second network device in any one of the second aspect or the optional manners of the second aspect. The network device includes at least one unit, and the at least one unit is configured to implement the method provided in any one of the second aspect or the optional manners of the second aspect.

In some embodiments, the unit in the network device is implemented by using software, and the unit in the network device is a program module. In some other embodiments, the unit in the network device is implemented by using hardware or firmware. For specific details of the network device provided in the fourth aspect, refer to any one of the first aspect or the optional manners of the first aspect or any one of the second aspect or the optional manners of the second aspect. Details are not described herein again.

According to a fifth aspect, a controller device is provided. The controller device has a function of implementing any one of the third aspect or the optional manners of the third aspect. The controller device includes at least one unit, and the at least one unit is configured to implement the method provided in any one of the third aspect or the optional manners of the third aspect. In some embodiments, the unit in the controller device is implemented by using software, and the unit in the controller device is a program module. In some other embodiments, the unit in the controller device is implemented by using hardware or firmware. For specific details of the controller device provided in the fifth aspect, refer to any one of the third aspect or the optional manners of the third aspect. Details are not described herein again.

According to a sixth aspect, a network device is provided. The network device includes a processor. The processor is coupled to a memory, the memory stores at least one computer program instruction, and the at least one computer program instruction is loaded and executed by the processor, so that the network device implements the method provided in any one of the first aspect or the optional manners of the first aspect or any one of the second aspect or the optional manners of the second aspect. For specific details of the network device provided in the sixth aspect, refer to any one of the first aspect or the optional manners of the first aspect or any one of the second aspect or the optional manners of the second aspect. Details are not described herein again.

According to a seventh aspect, a controller device is provided. The controller device includes a processor. The processor is coupled to a memory, the memory stores at least one computer program instruction, and the at least one computer program instruction is loaded and executed by the processor, so that the controller device implements the method provided in any one of the third aspect or the optional manners of the third aspect. For specific details of the controller device provided in the seventh aspect, refer to any one of the third aspect or the optional manners of the third aspect. Details are not described herein again.

According to an eighth aspect, a computer-readable storage medium is provided. The storage medium stores at least one instruction, and when the instruction is run on a computer, the computer is enabled to perform the method provided in any one of the first aspect or the optional manners of the first aspect or any one of the second aspect or the optional manners of the second aspect.

According to a ninth aspect, a computer-readable storage medium is provided. The storage medium stores at least one instruction, and when the instruction is run on a computer, the computer is enabled to perform the method provided in any one of the third aspect or the optional manners of the third aspect.

According to a tenth aspect, a computer program product is provided. The computer program product includes one or more computer program instructions, and when the computer program instructions are loaded and run by a computer, the computer is enabled to perform the method provided in any one of the first aspect or the optional manners of the first aspect or any one of the second aspect or the optional manners of the second aspect.

According to an eleventh aspect, a computer program product is provided. The computer program product includes one or more computer program instructions, and when the computer program instructions are loaded and run by a computer, the computer is enabled to perform the method provided in any one of the third aspect or the optional manners of the third aspect.

According to a twelfth aspect, a chip is provided. The chip includes a memory and a processor. The memory is configured to store computer instructions, and the processor is configured to invoke the computer instructions from the memory and run the computer instructions, to perform the method in any one of the first aspect or the optional manners of the first aspect or any one of the second aspect or the optional manners of the second aspect.

According to a thirteenth aspect, a chip is provided. The chip includes a memory and a processor. The memory is configured to store computer instructions, and the processor is configured to invoke the computer instructions from the memory and run the computer instructions, to perform the method provided in any one of the third aspect or the optional manners of the third aspect.

According to a fourteenth aspect, a network system is provided. The network system includes the network device according to the third aspect and the controller device according to the fourth aspect; or the network system includes the network device according to the fifth aspect and the controller device according to the sixth aspect.

DESCRIPTION OF EMBODIMENTS

Figure 1:
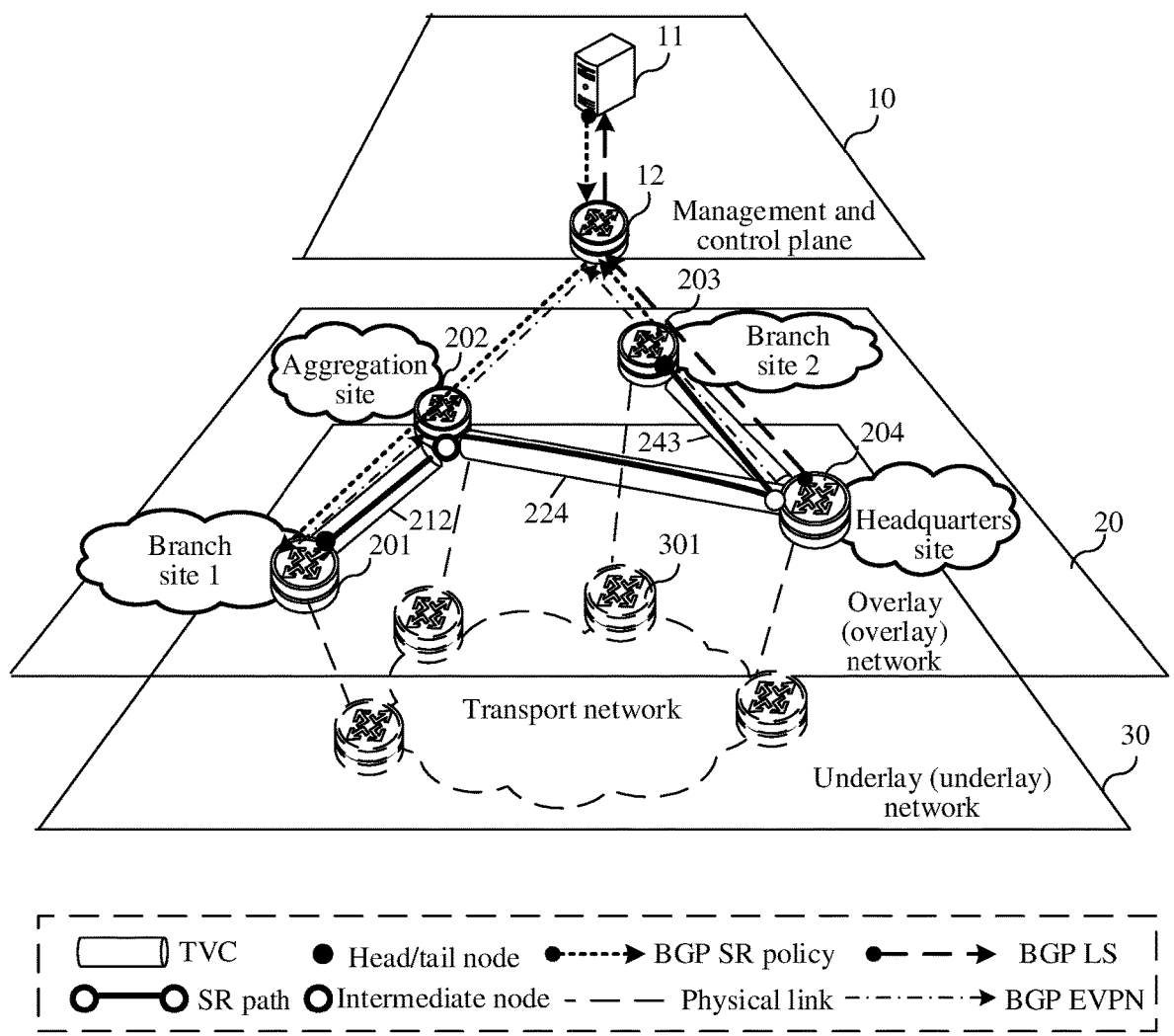
FIG. 1 is a schematic diagram of a system architecture of an SD-WAN according to an embodiment of this application.

To make the objectives, technical solutions, and advantages of this application clearer, the following further describes the implementations of this application in detail with reference to the accompanying drawings.

The following explains and describes some terms and concepts in embodiments of this application.

(1) Tunnel Virtual Connection (TVC)

A TVC is a logical virtual connection. The TVC usually crosses one or more transport networks.

(2) Connection

In embodiments of this application, the term "connection" may be replaced with a TVC, a tunnel, a path, a virtual connection, or a wide area network (WAN) link.

Optionally, the connection is a connection between different sites, and the connection passes through one or more network devices in an underlay transport network between the sites.

Optionally, an endpoint internet protocol (IP) address of the connection is an IP address of a WAN interface. Optionally, the connection is a unidirectional direction, and the connection is directional. For example, a connection from a network device a to a network device b and a connection from the network device b to the network device a are not a same connection. The connection from the network device a to the network device b is indicated by using a segment identifier (segment ID, SID), and the connection from the network device b to the network device a is indicated by using another SID. In other words, a forward connection and a reverse connection are indicated by using two different SIDs. Alternatively, the connection is a connection that is not directional. For example, a connection from a network device a to a network device b and a connection from the network device b to the network device a are indicated by using a same SID.

(3) Segment Routing (SR)

SR is a protocol designed based on a concept of source routing to forward a packet in a network. The SR divides a network path into segments, and assigns SIDs to these segments and forwarding nodes in the network. Segments and network nodes are arranged in order to obtain a segment list, so that a forwarding path can be indicated by using the segment list.

The SR encodes the segment list representing the forwarding path in a header of a data packet, and the segment list is transmitted along with the data packet. After receiving the data packet, a receive end parses the segment list. If an active SID of the segment list is a SID of a current node, the receive end performs an operation corresponding to the SID on the data packet; or if an active SID is not a SID of a current node, the receive end forwards the data packet to a next node in a conventional routing forwarding manner.

(4) Internet Protocol Version 6 for Segment Routing (SRv6)

SRv6 is a method designed based on a concept of source routing to forward an IPv6 packet in a network. SR based on an IPv6 forwarding plane inserts a routing extension header named a segment routing header (SRH) into an IPv6 packet, and pushes an explicit IPv6 address stack into the SRH. An intermediate node continuously performs destination address update and address stack offset operations to complete hop-by-hop forwarding. The SRv6 technology uses an existing IPv6 forwarding technology and flexible IPv6 extension headers to implement network programmability. SRv6 defines some IPv6 addresses as instantiated SIDs. Each SID has an explicit purpose and function. Different SID operations are performed to implement a simplified virtual private network (VPN) and flexible path planning.

(5) IP Address of a WAN Interface

A WAN interface is also referred to as a transport network port (TNP). An IP address of the WAN interface is different from an IP address named an SRv6 SID. The two IP addresses mainly differ in that the SRv6 SID is an address in a locator address pool of a network device, while the IP address of the WAN interface is an address assigned by an operator of an underlay network. For the IP address named the SRv6 SID, an IPv6 internal gateway protocol (IGP) routing protocol needs to be run between the network device and a device in the underlay network. Reachability of the IP address named the SRv6 SID in a traffic forwarding phase can be ensured only when the network device uses the IPv6 IGP routing protocol to advertise a locator route to the device in the underlay network so that the device in the underlay network can perceive the IP address named the SID. Therefore, a technical problem of dependency on the routing protocol of the underlay network may occur. For the IP address of the WAN interface, the operator of the underlay network ensures route reachability of the IP address of the WAN interface. The network device does not need to advertise an additional route by using the IPv6 IGP routing protocol. Therefore, dependency on the routing protocol of the underlay network is avoided.

(6) Software-Defined Wide Area Network (SD-WAN)

A software-defined wide area network (SD-WAN) is an important practice of software defined networking (SDN). The SD-WAN uses network controllers, and integrates network, security, and wide area network optimization technologies and other technologies, to implement WAN network configuration of an enterprise and automatic service provisioning and provide simple, flexible, and high-quality enterprise WAN interconnection capabilities. The SD-WAN usually has the following basic features:

1. Implement flexible IP overlay networking based on a hybrid WAN link.

The SD-WAN implements independence between the SD-WAN network and an underlay transport network by using a method of establishing an end-to-end overlay tunnel between edge devices of two sites. An underlay network link may be a multi-protocol label switching (MPLS) private line, or may be a public internet (Internet), a long term evolution (LTE) network, or the like.

2. Perform intelligent application path selection to ensure application experience. There are various types of enterprise applications. Common enterprise applications include production, collaboration, cloud, and entertainment applications, and the like. Different types of applications have different requirements on bandwidth and link quality. The SD-WAN usually identifies enterprise traffic by using an application identification technology such as deep packet inspection (DPI), and then performs type statistics collection, quality detection, and path control based on an application dimension. For example, it is preferentially specified that high-value application traffic is transmitted on a high-line quality but high-cost path, for example, MPLS, and it is specified that low-value application traffic is preferentially transmitted on a low-line quality but low-cost path, for example, the internet.

3. Perform centralized management and control and visualization, which is simple and implements easy operation and maintenance.

Centralized management is implemented through centralized network monitoring and visualization, to improve end-to-end WAN management and operation and maintenance efficiency.

(7) IGP

An IGP is a routing protocol that runs within an AS. The IGP protocol is, for example, an open shortest path first (OSPF) protocol or an intermediate system-to-intermediate system (IS-IS) protocol.

The following uses an example to describe a system architecture in embodiments of this application.

FIG. 1 is a schematic diagram of a system architecture of an SD-WAN network according to an embodiment of this application. The system architecture shown in FIG. 1 is optionally provided as an SD-WAN overlay SR architecture. The system architecture shown in FIG. 1 includes a management and control plane 10, an overlay network 20, and an underlay network 30.

The management and control plane 10 includes a controller device 11. Optionally, the management and control plane 10 further includes a route reflector (RR) 12.

The controller device 11 is a manager of the SD-WAN network. The controller device 11 is configured to manage a network device 201, a network device 202, a network device 203, a network device 204, and the RR 12. The controller device 11 is further configured to perform functions such as SD-WAN network service orchestration and configuration and SR path orchestration and computation. The controller device 11 is, for example, a server, a host, a terminal, or a network device.

The RR 12 is a control component of the SD-WAN network. The RR 12 is responsible for collecting network topologies between the network device 201, the network device 202, the network device 203, and the network device 204 in the SD-WAN network, distributing user routes, performing filtering, performing control, and the like. The RR 12 is, for example, a server, a host, a terminal, or a network device. In some other embodiments, the SD-WAN network does not include the RR 12, and all functions of the RR 12 are implemented by using the controller device 11.

FIG. 1 is described by using an example in which the controller device 11 and the RR 12 are separately disposed, in other words, the controller device 11 and the RR 12 are implemented by different physical devices communicatively coupled to each other. In some other embodiments, the controller device 11 and the RR 12 are disposed together, in other words, the controller device 11 and the RR 12 are integrated into a same physical device.

Existence of one controller device 11 and one RR 12 in the network shown in FIG. 1 is merely an example. Optionally, there are more controller devices 11 and RRs 12, and a quantity of controller devices 11 and a quantity of RRs 12 are not limited in this embodiment.

The overlay network 20 includes a plurality of network devices. The network device is a forwarding executor of an SD-WAN service. The network device is configured to collect physical network topology information, and perform tunnel encapsulation, encryption, and policy-based path selection for user traffic. The network device is, for example, a router, a switch, or a firewall.

Optionally, the network device in the overlay network 20 is an edge device, a point of presence (POP), or an aggregation device. The plurality of network devices in the overlay network 20 are separately deployed in a plurality of sites. Different network devices in the overlay network 20 are connected through a TVC.

FIG. 1 is described by using an example in which the network device is the network device 201, the network device 202, the network device 203, or the network device 204. The network device 201 is deployed in a branch site 1. The network device 202 is deployed in an aggregation site. The network device 203 is deployed in a branch site 2. The network device 204 is deployed in a headquarters site. The network device 201 is connected to the network device 202 through a TVC 212. The network device 202 is connected to the network device 204 through a TVC 224. The network device 204 is connected to the network device 203 through a TVC 243.

A scenario in which one network device is deployed in one site shown in FIG. 1 is merely an example. Optionally, more network devices may be deployed in one site. For example, dozens of, hundreds of, or more network devices are deployed in one site. A quantity of network devices deployed in one site is not limited in this embodiment.

A case in which four network devices exist in the network shown in FIG. 1 is merely an example. Optionally, there are more or fewer network devices. For example, there are three network devices, or there are dozens of, hundreds of, or more network devices. A quantity of network devices is not limited in this embodiment.

Optionally, each device in FIG. 1 is an independent hardware device, a cluster or a distributed system that includes a plurality of hardware devices, or a virtualization device implemented based on cloud computing and a network functions virtualization (NFV) technology. The virtualization device includes but is not limited to a virtual machine or a container.

The underlay network 30 includes but is not limited to an operator private line, the internet, or a private network built by an enterprise. The underlay network 30 includes at least one network device 301. Network devices 301 in the underlay network 30 are separately connected to the network devices in the overlay network through a physical link.

Optionally, the system architecture provided in this embodiment of this application is applied to a scenario in which traffic needs to be controlled to pass through one or more specified sites. The controller device is configured to orchestrate an SR path including network devices of a plurality of sites. For example, referring to FIG. 1, the SR path orchestrated by the controller device is the network device 201 in the branch site 1→the network device 202 in the aggregation site→the network device 204 in the headquarters site→the network device 203 in the branch site 2. Endpoints of the SR path include the network device 201 and the network device 203. Intermediate nodes through which the SR path passes include the network device 202 and the network device 204. The SR path includes the TVC 212, the TVC 224, and the TVC 243.

The system architecture shown in FIG. 1 is applicable to many application scenarios. The following provides example descriptions with reference to two typical application scenarios.

Figure 2:
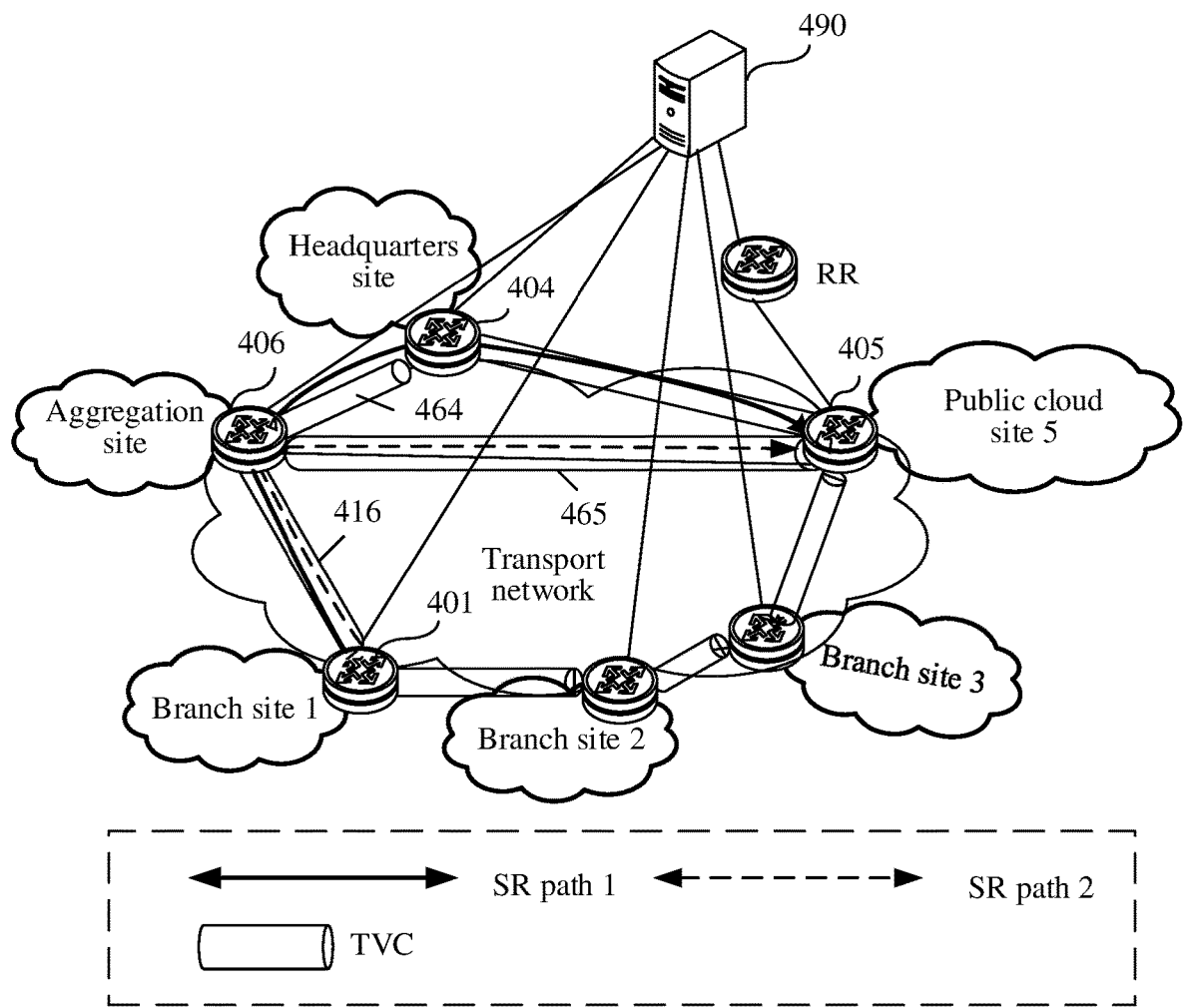
FIG. 2 is a schematic diagram of applying a system architecture of an SD-WAN to an enterprise network according to an embodiment of this application.

A typical application scenario of embodiments of this application is an enterprise SD-WAN scenario. FIG. 2 is a schematic diagram of a scenario in which an SD-WAN overlay SR architecture is applied to an enterprise network according to an embodiment of this application. An enterprise uses an SD-WAN tunnel and a transport network, for example, a leased operator private line, the internet, or a 5G network, to implement interconnection between branch sites, thereby meeting enterprise networking, cloud access, and internet access service requirements. In some large-scale enterprise networking, there may be a hierarchical networking scenario, which has a requirement of passing through an SD-WAN site to perform multi-node SR path orchestration and control. For example, referring to FIG. 2, to meet a requirement of accessing a public cloud by a user at a branch site 1, an SD-WAN controller 490 orchestrates two SR paths. An SR path 1 is the branch site 1→an aggregation site→a headquarters site→a public cloud site 5. An SR path 2 includes the branch site 1→the aggregation site→the public cloud site 5.

Figure 3:
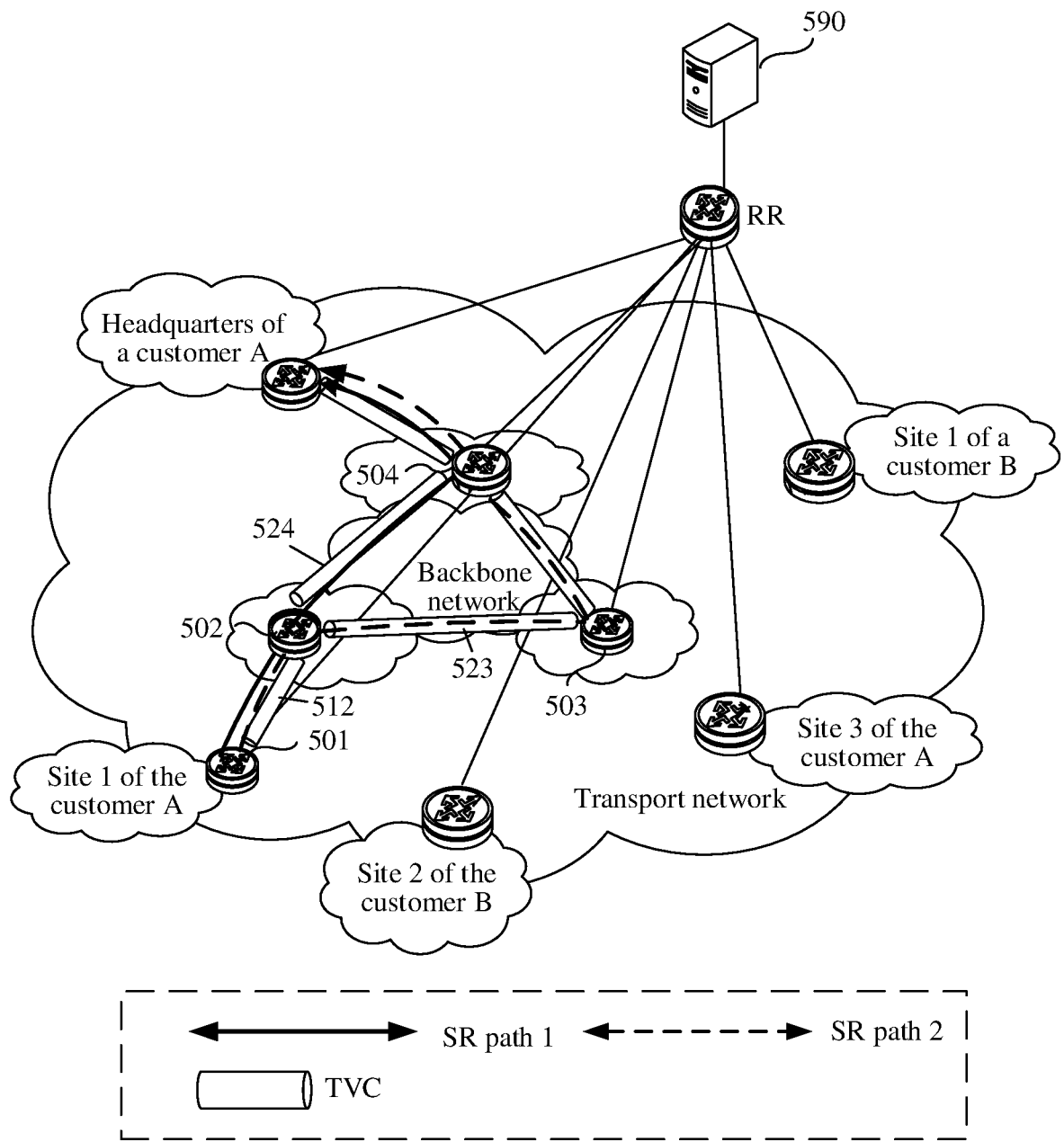
FIG. 3 is a schematic diagram of applying a system architecture of an SD-WAN to operator POP networking according to an embodiment of this application.

Another typical application scenario of embodiments of this application is an operator SD-WAN POP networking scenario. FIG. 3 is a schematic diagram of applying an SD-WAN overlay SR architecture to an operator SD-WAN POP networking scenario according to an embodiment of this application. An operator or a managed service provider (MSP) deploys SD-WAN devices in different regions as POP gateways (GW) and uses an inter-cloud internet and cloud private-line resources to quickly and flexibly construct an SD-WAN backbone network covering the whole country or even the world. An enterprise branch site is connected to a nearest POP access point of the operator/MSP through a local internet line. When cross-region service access is implemented by using the SD-WAN backbone network, there is a need to orchestrate an SR path that passes through a plurality of POP points. For example, to meet a requirement of a user at a site 1 of a customer A to access enterprise headquarters, an SD-WAN controller 590 orchestrates two SR paths. An SR path 1 is the site 1 of the customer A→a POP GW 502→a POP GW 504→headquarters of the customer A. An SR path 2 is the site 1 of the customer A→the POP GW 502→a POP GW 503→the POP GW 504→the headquarters of the customer A.

The following describes communication protocols in some embodiments of this application.

The communication protocols in some embodiments of this application include a border gateway protocol-link state (BGP LS) protocol, a border gateway protocol (BGP) SRv6 policy (BGP SRv6 policy) protocol, and a BGP Ethernet VPN (EVPN) protocol.

The BGP LS protocol is used to support a network topology collection function and a traffic engineering (TE) database (DB) information collection function.

The BGP LS protocol is used between a controller device and a network device and between network devices. Optionally, if a network includes an RR, the BGP LS protocol is further used between the controller and the RR and between the RR and the network device.

The BGP SRv6 policy protocol is used to support a function of tunnel policy delivery. The BGP SRv6 policy protocol is used between the controller device and the network device and between network devices. Optionally, if a network includes an RR, the BGP SRv6 policy protocol is further used between the controller and the RR and between the RR and the network device.

The BGP EVPN protocol is used to support a function of advertising an SD-WAN TNP route and a function of advertising a VPN service route. The BGP EVPN protocol is used between network devices. Optionally, if a network includes an RR, the BGP EVPN protocol is further used between the RR and the network device.

The following uses an example to describe a method procedure in embodiments of this application.

Figure 4:
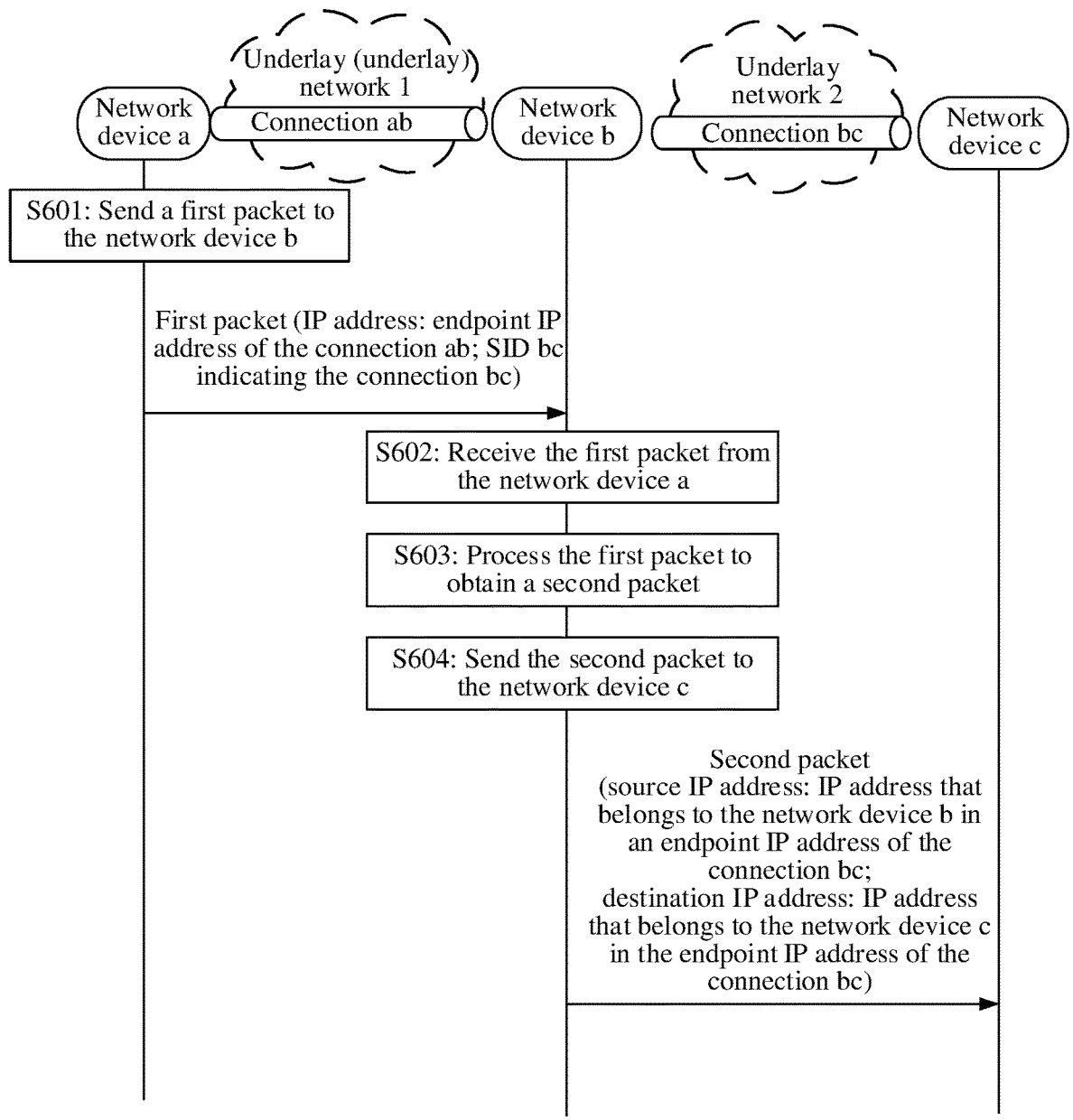
FIG. 4 is a flowchart of a packet processing method according to an embodiment of this application.

FIG. 4 is a flowchart of a packet processing method according to an embodiment of this application.

The method shown in FIG. 4 involves interaction between a plurality of network devices. To distinguish between different network devices, "a network device a", "a network device b", and "a network device c" are used to distinguishably describe the plurality of different network devices. The network device b is an intermediate node through which an SR path passes. The network device a is a head end of the SR path or an intermediate node through which the SR path passes. The network device c is a tail end of the SR path or an intermediate node through which the SR path passes.

The method shown in FIG. 4 involves connections between different network devices. To distinguishably describe different connections, "a connection ab" is used to refer to a connection from the network device a to the network device b, and "a connection bc" is used to refer to a connection from the network device b to the network device c.

Optionally, a network deployment scenario on which the method shown in FIG. 4 is based is shown in FIG. 1. For example, it can be learned, with reference to FIG. 1, that the network device a in the method shown in FIG. 4 is the network device 201 in FIG. 1, the network device b in the method shown in FIG. 4 is the network device 202 in FIG. 1, and the network device c in the method shown in FIG. 4 is the network device 204 in FIG. 1; or the network device a in the method shown in FIG. 4 is the network device 202 in FIG. 1, the network device b in the method shown in FIG. 4 is the network device 204 in FIG. 1, and the network device c in the method shown in FIG. 4 is the network device 203 in FIG. 1.

The method shown in FIG. 4 is optionally applied to an SD-WAN network.

A typical application scenario of the method shown in FIG. 4 is interconnection between branch sites in an enterprise network. A networking scenario shown in FIG. 2 is used as an example. The method shown in FIG. 4 is applied to the scenario shown in FIG. 2. When traffic of a user at the branch site 1 needs to be controlled to access the public cloud site 5 through the SR path 1, the network device a in the method shown in FIG. 4 is an edge device 401 in FIG. 2, the network device b in the method shown in FIG. 4 is an edge device 406 in FIG. 2, the network device c in the method shown in FIG. 4 is an edge device 404 in FIG. 2, the connection ab in the method shown in FIG. 4 is a TVC 416 in FIG. 2, and the connection bc in the method shown in FIG. 4 is a TVC 464 in FIG. 2. When traffic of a user at the branch site 1 needs to be controlled to access the public cloud site 5 through the SR path 2, the network device a in the method shown in FIG. 4 is an edge device 401 in FIG. 2, the network device b in the method shown in FIG. 4 is an edge device 406 in FIG. 2, the network device c in the method shown in FIG. 4 is an edge device 405 in FIG. 2, the connection ab in the method shown in FIG. 4 is a TVC 416 in FIG. 2, and the connection bc in the method shown in FIG. 4 is a TVC 465 in FIG. 2.

A typical application scenario of the method shown in FIG. 4 is operator SD-WAN POP networking. A networking scenario shown in FIG. 3 is used as an example. The method shown in FIG. 4 is applied to the scenario shown in FIG. 3.

When traffic of the site 1 of the customer A needs to be controlled to access enterprise headquarters through the SR path 1, the network device a in the method shown in FIG. 4 is an edge device 501 in the site 1 in FIG. 3, the network device b in the method shown in FIG. 4 is the POP GW 502 in FIG. 3, the network device c in the method shown in FIG. 4 is the POP GW 504 in FIG. 3, the connection ab in the method shown in FIG. 4 is a TVC 512 in FIG. 3, and the connection bc in the method shown in FIG. 4 is a TVC 524 in FIG. 3. When traffic of the site 1 of the customer A needs to be controlled to access enterprise headquarters through the SR path 2, the network device a in the method shown in FIG. 4 is an edge device 501 in the site 1 in FIG. 3, the network device b in the method shown in FIG. 4 is the POP GW 502 in FIG. 3, the network device c in the method shown in FIG. 4 is the POP GW 503 in FIG. 3, the connection ab in the method shown in FIG. 4 is a TVC 512 in FIG. 3, and the connection bc in the method shown in FIG. 4 is a TVC 523 in FIG. 3.

The method shown in FIG. 4 is optionally applied to a scenario in which a plurality of packets are processed, for example, a scenario in which each packet in a data flow is processed. For ease of understanding by a reader, the method shown in FIG. 4 is described by using a processing procedure for a first packet as an example. For a manner of processing another packet, refer to a manner of processing the first packet.

S601: A network device a sends the first packet to a network device b.

An IP address of the first packet includes an endpoint IP address of a connection ab. Specifically, the endpoint IP address of the connection ab includes an IP address that belongs to the network device a and an IP address that belongs to the network device b. A source IP address of the first packet is the IP address that belongs to the network device a in the endpoint IP address of the connection ab. A destination IP address of the first packet is the IP address that belongs to the network device b in the endpoint IP address of the connection ab.

In some embodiments, the first packet includes an original packet and an outer-layer IP header. The original packet is a data packet sent by user equipment. The outer-layer IP header is an IP header encapsulated in an outer layer of the original packet. The endpoint IP address of the connection ab is located in the outer-layer IP header of the first packet. Specifically, the IP address that belongs to the network device a in the endpoint IP address of the connection ab is located in a source address field in the outer-layer IP header of the first packet, and the IP address that belongs to the network device b in the endpoint IP address of the connection ab is located in a destination address field in the outer-layer IP header of the first packet.

Optionally, the endpoint IP address of the connection ab is an IP address that is of a WAN interface and that is assigned by an operator of an underlay network. A connection established through a WAN interface is also referred to as a WAN link. In an example embodiment, the network device a has a WAN interface a, and the network device b has a WAN interface b. The connection ab is a network connection established between the WAN interface a of the network device a and the WAN interface b of the network device b. The connection ab passes through one or more network devices in an underlay network 1. The endpoint IP address of the connection ab includes an IP address of the WAN interface a and an IP address of the WAN interface b. The IP address of the WAN interface a and the IP address of the WAN interface b are IP addresses assigned by an operator of the underlay network 1. The source IP address of the first packet is the IP address of the WAN interface a. The destination IP address of the first packet is the IP address of the WAN interface b.

The first packet includes a SID bc. The SID bc is a SID used to indicate a connection bc. The SID bc can act as an identifier of the connection bc.

Optionally, the SID bc is in a form of an MPLS label, or the SID bc is in a form of an SRv6 SID, or the SID bc is in a form of a combination of an identifier of a source site, an identifier of a destination site, an identifier of a source TNP, and an identifier of a destination TNP. For example, the network device b is a network device in a site b, and a network device c is a network device in a site c. The connection bc is a network connection established between the WAN interface b of the network device b and a WAN interface c of the network device c. The SID bc is in a form of a combination of an identifier of the site b, an identifier of the site c, an identifier of the WAN interface b, and an identifier of the WAN interface c. When the SID is implemented in a form of the SRv6 SID, an existing SRv6 mechanism can be reused. When the SID is implemented in a form of a short label, a quantity of bytes is small, extra bandwidth consumption is low, and transmission efficiency is higher.

In a possible implementation, the first packet includes a segment routing header. The SID bc is located in the segment routing header of the first packet. Optionally, the segment routing header of the first packet is an SRv6 header, the SRv6 header of the first packet includes a segment list (segment list), and the SID bc is located in the segment list in the SRv6 header of the first packet. Optionally, the segment routing header of the first packet is an SR-MPLS header, the SR-MPLS header of the first packet includes a label stack, and the SID bc is located in the label stack in the SR-MPLS header of the first packet. The SID bc is a topmost label of the label stack of the first packet.

Optionally, the first packet further includes a SID ab, and the SID ab indicates the connection ab.

S602: The network device b receives the first packet from the network device a.

In some embodiments, after the network device a sends the first packet through the WAN interface a, the first packet first arrives at a network device in the underlay network 1. The network device in the underlay network 1 performs a query in a routing table based on the destination IP address (namely, the IP address of the WAN interface b of the network device b) of the first packet to obtain an outbound interface and a next hop that correspond to the IP address of the WAN interface b. The network device in the underlay network 1 forwards the packet based on the outbound interface and the next hop that correspond to the IP address of the WAN interface b, so that the first packet is forwarded to the WAN interface b of the network device b. The network device b receives the first packet through the WAN interface b.

S603: The network device b processes the first packet to obtain a second packet.

The network device b obtains the SID bc from the first packet. The network device b determines the connection bc based on the SID bc. The network device b obtains an endpoint IP address of the connection bc. The network device b updates the source IP address of the first packet by using an IP address that belongs to the network device b in the endpoint IP address of the connection bc, and updates the destination IP address of the first packet by using an IP address that belongs to the network device c in the endpoint IP address of the connection bc, to update the first packet to the second packet.

An IP address of the second packet includes the endpoint IP address of the connection bc. Specifically, the endpoint IP address of the connection bc includes the IP address that belongs to the network device b and the IP address that belongs to the network device c. A source IP address of the second packet is the IP address that belongs to the network device b in the endpoint IP address of the connection bc. A destination IP address of the second packet is the IP address that belongs to the network device c in the endpoint IP address of the connection bc.

In some embodiments, the second packet includes an original packet and an outer-layer IP header. The original packet in the second packet is the same as the original packet in the first packet. The endpoint IP address of the connection bc is located in the outer-layer IP header of the second packet. Specifically, the IP address that belongs to the network device b in the endpoint IP address of the connection bc is located in a source address field in the outer-layer IP header of the second packet, and the IP address that belongs to the network device c in the endpoint IP address of the connection bc is located in a destination address field in the outer-layer IP header of the second packet.

Optionally, the endpoint IP address of the connection bc is an IP address that is of a WAN interface and that is assigned by an operator of an underlay network. In an example embodiment, the network device b has the WAN interface b, and the network device c has a WAN interface c. The connection bc is a network connection established between the WAN interface b of the network device b and the WAN interface c of the network device c. The connection bc passes through one or more network devices in an underlay network 2. The endpoint IP address of the connection bc includes the IP address of the WAN interface b and an IP address of the WAN interface c. The IP address of the WAN interface c and the IP address of the WAN interface b are IP addresses assigned by an operator of the underlay network 2. The source IP address of the second packet is the IP address of the WAN interface b. The destination IP address of the second packet is the IP address of the WAN interface c.

There are a plurality of cases regarding whether the second packet includes a segment routing header and regarding content of a segment routing header when the second packet includes the segment routing header. Optionally, the second packet includes a segment routing header, and a segment list of the segment routing header in the second packet includes a SID of a downstream node of the network device c, so that the downstream node of the network device c continues to forward the packet based on the SID. Optionally, the segment list of the segment routing header in the second packet is the same as the segment list of the segment routing header in the first packet. For example, in a process of processing the packet, the network device b keeps content of the segment list of the segment routing header unchanged, and updates an SL field of the segment routing header, so that a SID to which the SL field in the packet points changes from the SID bc to a next SID of the SID bc. The next SID of the SID bc is a SID of the network device c. Optionally, the segment list of the segment routing header in the second packet is different from the segment list of the segment routing header in the first packet, and the segment list of the segment routing header in the second packet does not include a SID bc. For example, in a process of processing the packet, the network device b performs a label switching operation, and updates the SID bc to another label. Optionally, the second packet does not include a segment routing header. For example, the network device b is a penultimate-hop node in the SR path, the network device c is a tail node in the SR path, and in a process of processing the packet, the network device b enables, by using a penultimate hop popping feature, the segment routing header of the first packet to pop up.

Optionally, the second packet further includes the SID ab, and the SID ab indicates the first connection.

The network device b may obtain, by using a plurality of implementations, the IP address that belongs to the network device c in the endpoint IP address of the connection bc. In a possible implementation, the network device c advertises a TNP route in advance. The TNP route includes the IP address that belongs to the network device c in the endpoint IP address of the connection bc. The network device b receives the TNP route advertised by the network device c, and the network device b obtains the IP address of the network device c from the TNP route. Optionally, the network device c establishes a BGP protocol neighbor relationship with an RR. The network device c reports the TNP route to the RR based on a BGP protocol. The RR reflects the TNP route reported by the network device c, and sends the TNP route to the network device b.

A value of a SID may be determined by using a plurality of implementations. The following provides example descriptions with reference to two implementations.

Implementation 1: A controller device assigns a SID to each connection.

For example, the controller device assigns the SID ab to the connection ab and the SID bc to the connection bc. The controller device sends the SID ab to the network device a, and the controller device sends the SID bc to the network device b. The network device a receives the SID ab sent by the controller device. The network device b receives the SID bc sent by the controller device.

Implementation 2: A network device assigns a SID to each connection established at a local end.

For example, the network device a assigns the SID ab to the connection ab. The network device a sends the SID ab to a controller device. The network device b assigns the SID bc to the connection bc. The network device b sends the SID bc to the controller device.

S604: The network device b sends the second packet to the network device c.

Optionally, the connection ab is a connection between different sites. For example, the network device a is a network device in a site a, the network device b is a network device in a site b, the connection ab is a connection between the site a and the site b, and the connection ab passes through an underlay network between the site a and the site b.

Optionally, the connection bc is a connection between different sites. For example, the network device b is a network device in the site b, the network device c is a network device in a site c, the connection bc is a connection between the site b and the site c, and the connection bc passes through an underlay network between the site b and the site c.

Optionally, the downstream node of the network device c in the SR path includes a network device d. The WAN interface c of the network device c is connected to a WAN interface d of the network device d through a connection cd. The first packet and the second packet further include a SID cd, and the SID cd indicates the connection cd.

According to the method provided in this embodiment, in a traffic forwarding phase, a network device acting as an intermediate node in the SR path updates a source IP address of a packet based on an IP address that belongs to a local end in an endpoint IP address of a connection, and updates a destination IP address of the packet based on an IP address that belongs to a remote end in the endpoint IP address of the connection. Therefore, in a scenario in which the SR path crosses underlay transport networks in a plurality of different routing domains, a problem that a packet is discarded because a source IP address is always an IP address of a head end and URPF check fails is avoided. In addition, the endpoint IP address of the connection is usually an IP address of a WAN interface of a network device, the IP address is usually an IP address assigned by an operator of a transport network, the transport network can naturally ensure route reachability of the IP address, and an underlay network device does not need to run an IGP protocol that supports SR-MPLS or an IGP protocol that supports SRv6 to ensure route reachability of the destination IP address. Therefore, there is no need to depend on the routing protocol of the underlay transport network.

Optionally, the SID bc in the method shown in FIG. 4 is a SID of an End.X-SD-WAN type.

End.X-SD-WAN is a new type of SID provided in this embodiment of this application. Endpoint behaviors corresponding to End.X-SD-WAN include updating a source IP address of a packet by using an IP address that belongs to a local end in an endpoint IP address of a connection and updating a destination IP address of the packet by using an IP address that belongs to a peer end in the endpoint IP address of the connection. In some embodiments, the endpoint behaviors corresponding to End.X-SD-WAN specifically include: querying, based on an active SID in the packet, a TVC source IP address (namely, the IP address that belongs to the local end in the endpoint IP address of the connection) that is in a TVC database and that corresponds to the active SID, a TVC destination IP address (namely, the IP address that belongs to the peer end in the endpoint IP address of the connection) that is in the TVC database and that corresponds to the active SID, and a TVC outbound interface that is in the TVC database and that corresponds to the active SID; updating the source address of the packet by using the TVC source IP address, and updating the destination address of the packet by using the TVC destination IP address, to obtain an updated packet; and sending the updated packet through the TVC outbound interface corresponding to the active SID. The active SID is a to-be-processed SID of a current device. For SRv6, the active SID is a SID in a segment list indicated by an SL field in an SRH in the packet. For SR-MPLS, the active SID is a topmost label of a label stack in the packet.

In some embodiments, pseudocode for implementing End.X-SD-WAN is shown below.

```
End.x-sdwan:
S01.    When an SRH is processed {
S02.        If (Segments Left == 0) {
S03.            Stop processing the SRH, and proceed to process the next
                header in the packet, whose type is identified by
                the Next Header field in the routing header.
```

-continued

```
    S04.            }
    ...
    S12.            Decrement IPv6 Hop Limit by 1
    S13.            Decrement Segments Left by 1
    S14.            Lookup Tunnel virtual connection DB with Segment List[Segments Left],
update IPV6 SA and DA with TVC source IP and destination ip
    S15.            Submit the packet to the Tunnel virtual connection
    S16.            }
A meaning of the pseudocode shown above is shown below.
End.X-SD-WAN:
    S01.            When an SRH is processed {
    S02.            If (Segments Left == 0) {
    S03.            Stop processing the SRH, and proceed to process the next header (next header)
of the SRH in the packet, whose type is identified by a next header field in the routing header. }
    ...
    S12.            Decrement an IPV6 hop limit by 1.
    S13.            Decrement Segments Left by 1.
    S14.            Search a TVC database by using a SID indicated by the segments left
(segments left, SL) field of the segment list; and update an IPV6 source address (source address,
SA) of the packet by using a found TVC source IP address, and update an IPV6 destination
address (destination address, DA) field of the packet by using a found TVC destination IP
address.
    S15.            Submit the packet to an IPV6 forwarding module, and forward the packet to a
new destination through a corresponding TVC outbound interface.
    S16.            }
```

A meaning of the pseudocode shown above is shown below.

```
End.X-SD-WAN:
    S01. When an SRH is processed {
    S02. If (Segments Left == 0) {
    S03. Stop processing the SRH, and proceed to process the
next header (next header) of the SRH in the packet, whose type
is identified by a next header field in the routing header. }
    ...
    S12. Decrement an IPv6 hop limit by 1.
    S13. Decrement Segments Left by 1.
    S14. Search a TVC database by using a SID indicated by the
segments left (SL) field of the segment list; and update an IPv6
source address (SA) of the packet by using a found TVC source
IP address, and update an IPv6 destination address (DA) field of
the packet by using a found TVC destination IP address.
    S15. Submit the packet to an IPv6 forwarding module, and for-
ward the packet to a new destination through a corresponding
TVC outbound interface.
    S16. }
```

A process in which the network device b processes the first packet includes: The network device b performs the endpoint behaviors corresponding to End.X-SD-WAN on the first packet, to obtain the second packet. Specifically, the network device b pre-creates and stores a local SID table. The local SID table is used to store a correspondence between a SID, a SID type, and an outbound interface. In the local SID table, a SID type corresponding to the SID bc is End.X-SD-WAN, and an outbound interface corresponding to the SID bc is the WAN interface b. After the network device b receives the first packet, the network device b performs a query in the local SID table based on the SID bc in the first packet, to find that the SID type corresponding to the SID bc is End.X-SD-WAN, and the outbound interface is the WAN interface b. Therefore, the network device b performs the endpoint behaviors corresponding to the End.X-SD-WAN. To be specific, the network device b updates the source address and the destination address of the first packet by using the endpoint IP address of the connection bc, and sends the obtained second packet through the WAN interface b.

Optionally, a network device establishes a correspondence between a SID of the End.X-SD-WAN type and a TVC and a correspondence between a TVC and a WAN interface. In a packet forwarding process, the network device first queries a corresponding TVC based on the SID in the packet, then queries a corresponding WAN interface based on the TVC, and forwards the packet through the WAN interface. For example, in the method shown in FIG. 4, the network device b first queries a corresponding outbound interface based on the SID bc, to obtain a TVC bc (namely, the connection bc), and then queries an outbound interface corresponding to the TVC bc, to obtain the WAN interface b.

Optionally, the SID ab in the method shown in FIG. 4 is a SID of the End.X-SD-WAN type. A specific process in which the network device a sends the first packet includes: The network device a receives the original packet from the user equipment. The network device a performs a query in a routing table based on a destination IP address of the original packet. The network device a finds that the destination IP address of the original packet corresponds to an SR policy. A segment list in the SR policy includes the SID ab corresponding to the connection ab and the SID bc corresponding to the connection bc. The SID ab is the first SID in the segment list. The network device a performs a query in a local SID table based on the SID ab, to determine that a connection corresponding to the SID ab is the connection ab, an outbound interface corresponding to the SID ab is the WAN interface a, and endpoint behaviors corresponding to the SID ab include: updating a source IP address of the packet by using an IP address that belongs to a local end in the endpoint IP address of the connection and updating the destination IP address of the packet by using an IP address that belongs to a peer end in the endpoint IP address of the connection. The network device a adds the outer-layer IP header and an SRH to the original packet based on the endpoint behaviors corresponding to the SID ab, to obtain the first packet. A source IP address of the outer-layer IP header of the first packet is the IP address that belongs to the network device a in the endpoint IP address of the connection, and a destination IP address of the outer-layer IP header is the IP address that belongs to the network device b in the endpoint IP address of the connection. The SRH includes the SID bc. The network device a sends the first packet through the WAN interface a.

In this embodiment, the SID of the End.X-SD-WAN type is provided, traffic forwarding based on an SR path including a plurality of TVCs is supported, and a packet is encapsulated based on an endpoint IP address of a TVC (without using a SID), so that an overlay SR tunneling technology decoupled from an underlay network is implemented. Specifically, in an existing SRv6 technology, End.X is used to obtain a next-hop SID of a segment list in an SRH, use the next-hop SID as a destination IP address of an IPv6 packet, and send a packet whose destination IP address is a SID through a specified link. As a result, an edge device and an intermediate transport network device need to interact by using an IGP protocol, and the edge device needs to advertise a locator prefix route corresponding to the SID to all devices in a transport network. Otherwise, the devices in the transport network cannot find a route based on the destination IP address of the packet, and therefore cannot forward the packet to the edge device corresponding to the SID. However, in this embodiment, because functions of End.X-SD-WAN include searching a TVC database based on a next-hop SID in a segment list in an SRH, updating a source IP address and a destination IP address of an IPv6 packet based on a source IP address of a TVC and a destination IP address of the TVC in the TVC database, and then sending an updated packet through a physical link corresponding to the TVC. The source IP address of the TVC and the destination IP address of the TVC are IP addresses of WAN interfaces on an edge device, the IP address of the WAN interface is usually assigned by an intermediate transport network, and a route can be naturally forwarded in the transport network. Therefore, an SR packet encapsulated in this way does not have problems of route searching and a URPF check failure.

The following describes a specific implementation in a scenario in which the underlay network is an IPv6 network. An implementation described below may be provided as an SD-WAN SRv6 tunneling technology.

When the underlay network is an IPv6 network, an endpoint IP address that is of a connection and that is added by a network device to a packet is an IPv6 address. An outer-layer IP header of the packet is an IPv6 header. A source IP address and a destination IP address in the IPv6 header are IPv6 addresses.

The method shown in FIG. 4 is used as an example. When the underlay network 1 corresponding to the connection ab is an IPv6 network, optionally, both the network device a and the network device b are network devices that support IPv6. The endpoint IP address of the connection ab in the first packet is an IPv6 address. The first packet includes an outer-layer IPv6 header, the SRH, and the original packet. The endpoint IP address of the connection ab is located in the outer-layer IPv6 header of the first packet. Specifically, an IPv6 address that belongs to the network device a in the endpoint IP address of the connection ab is located in a source address field in the outer-layer IPv6 header of the first packet. An IPv6 address that belongs to the network device b in the endpoint IP address of the connection ab is located in a destination address field in the outer-layer IPv6 header of the first packet. The first packet includes the SRH. The SID bc is located in the SRH of the first packet.

Similarly, when an underlay network of the connection bc is an IPv6 network, optionally, both the network device b and the network device c are network devices that support IPv6. The endpoint IP address of the connection bc in the second packet is an IPv6 address. The second packet includes an outer-layer IPv6 header and the original packet. The endpoint IP address of the connection bc is located in the outer-layer IPv6 header of the second packet. Specifically, an IPv6 address that belongs to the network device b in the endpoint IP address of the connection bc is located in a source address field in the outer-layer IPv6 header of the second packet. An IPv6 address that belongs to the network device c in the endpoint IP address of the connection bc is located in a destination address field in the outer-layer IPv6 header of the second packet.

The following describes a specific implementation in a scenario in which the underlay network is an IPv4 network. An implementation described below may be provided as an SD-WAN SRv4 tunneling technology.

When the underlay network is an internet protocol version 4 (IPv4) network, an endpoint IP address that is of a connection and that is added by a network device to a packet is an IPv4 address. An outer-layer IP header of the packet is an IPv4 header. A source IP address and a destination IP address in the IPv4 header are IPv4 addresses. The packet includes a protocol type corresponding to an SRH, and the protocol type corresponding to the SRH is located in an outer layer of the SRH in the packet. A specific location for carrying the protocol type corresponding to the SRH includes a plurality of implementations. The following provides example descriptions with reference to three implementations.

Figure 5:
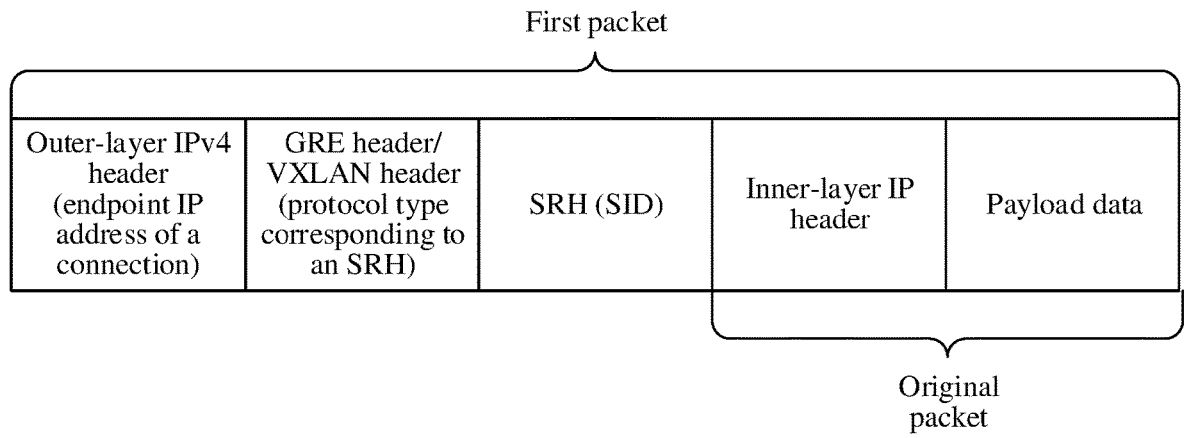
FIG. 5 is a schematic diagram of a packet format according to an embodiment of this application.

Implementation 1: The network device encapsulates a generic routing encapsulation (GRE) header between the outer-layer IPv4 header and the SRH. The GRE header includes the protocol type corresponding to the SRH. In a possible implementation, the protocol type corresponding to the SRH is located in a payload protocol field in the GRE header. FIG. 5 is a schematic diagram of a format of encapsulating an SD-WAN SRv4 tunnel packet through GRE. As shown in FIG. 5, the packet includes an outer-layer IP header, a GRE header, an SRH, and an original packet.

Implementation 2: The network device encapsulates a virtual extensible local area network (VXLAN) header between the outer-layer IPv4 header and the SRH. The VXLAN header includes the protocol type corresponding to the SRH. In a possible implementation, the protocol type corresponding to the SRH is located in a next protocol field in the VXLAN header.

Implementation 3: The network device adds the protocol type corresponding to the SRH to the outer-layer IPv4 header.

The method shown in FIG. 4 is used as an example. When the underlay network of the connection ab is an IPv4 network, optionally, both the network device a and the network device b are network devices that support IPv4. The endpoint IP address of the connection ab in the first packet is an IPv4 address. The first packet includes an outer-layer IPv4 header, the SRH, and the original packet. The endpoint IP address of the connection ab is located in the outer-layer IPv4 header of the first packet. Specifically, an IPv4 address that belongs to the network device a in the endpoint IP address of the connection ab is located in a source address field in the outer-layer IPv4 header of the first packet. An IPv4 address that belongs to the network device b in the endpoint IP address of the connection ab is located in a destination address field in the outer-layer IPv4 header of the first packet. The first packet includes the SRH. The SID bc is located in the SRH of the first packet. The first packet includes the protocol type corresponding to the SRH.

When Implementation 1 is used, the first packet includes a GRE header. The GRE header of the first packet is located between the outer-layer IPv4 header and the SRH. The protocol type corresponding to the SRH is located in the GRE header of the first packet. When Implementation 2 is used, the first packet includes a VXLAN header. The VXLAN header of the first packet is located between the outer-layer IPv4 header and the SRH, and the protocol type corresponding to the SRH is located in the VXLAN header of the first packet. When Implementation 3 is used, the protocol type corresponding to the SRH is located in the IPv4 header of the first packet.

Similarly, when an underlay network of the connection bc is an IPv4 network, optionally, both the network device b and the network device c are network devices that support IPv4. The endpoint IP address of the connection bc in the second packet is an IPv4 address. The second packet includes an outer-layer IPv4 header and the original packet. The endpoint IP address of the connection bc is located in the outer-layer IPv4 header of the second packet. Specifically, an IPv4 address that belongs to the network device b in the endpoint IP address of the connection bc is located in a source address field in the outer-layer IPv4 header of the second packet. An IPv4 address that belongs to the network device c in the endpoint IP address of the connection bc is located in a destination address field in the outer-layer IPv4 header of the second packet.

The following describes a specific implementation in a scenario in which the underlay network includes an IPv6 network and an IPv4 network. An implementation described below may be provided as an SD-WAN SRv6 and SRv4 hybrid tunneling technology.

When the underlay network includes an IPv6 network and an IPv4 network, the network device converts a packet encapsulation format, and updates an outer-layer IP header of a packet from an IPv4 header to an IPv6 header, or updates an outer-layer IP header of a packet from an IPv6 header to an IPv4 header.

For example, in the method shown in FIG. 4, when the underlay network of the connection ab is an IPv4 network and an underlay network of the connection bc is an IPv6 network, optionally, the network device a is a device that supports the IPv4 network, the network device b is a device that supports both the IPv4 network and the IPv6 network, and the network device c is a device that supports the IPv6 network. The endpoint IP address of the connection ab in the first packet is an IPv4 address. The endpoint IP address of the connection bc in the second packet is an IPv6 address. A process in which the network device b processes the packet includes: The network device b decapsulates, from the first packet, an outer-layer IPv4 header that includes the endpoint IP address of the connection ab. The network device b generates an outer-layer IPv6 header that includes the endpoint IP address of the connection bc. The network device b encapsulates, into the packet, the outer-layer IPv6 header that includes the endpoint IP address of the connection bc, to obtain the second packet.

When the underlay network of the connection ab is an IPv6 network and an underlay network of the connection bc is an IPv4 network, optionally, the network device a is a device that supports the IPv6 network, the network device b is a device that supports both the IPv4 network and the IPv6 network, and the network device c is a device that supports the IPv4 network. The endpoint IP address of the connection ab in the first packet is an IPv6 address. The endpoint IP address of the connection bc in the second packet is an IPv4 address. A process in which the network device b processes the packet includes: The network device b decapsulates, from the first packet, an outer-layer IPv6 header that includes the endpoint IP address of the connection ab. The network device b generates an outer-layer IPv4 header that includes the endpoint IP address of the connection bc. The network device b encapsulates, into the packet, the outer-layer IPv4 header that includes the endpoint IP address of the connection bc, to obtain the second packet.

In a possible implementation, the network device stores a correspondence between a connection and an encapsulation type. The network device determines, based on an encapsulation type corresponding to a connection, a packet header to be encapsulated into an original packet. For example, after the network device b determines a connection corresponding to a SID, if an encapsulation type corresponding to the connection is SRv6, the network device b encapsulates an IPv6 header and an SRH into the first packet. If an encapsulation type corresponding to the connection is SRv4-GRE, the network device b encapsulates an IPv4 header, a GRE header, and an SRH into the first packet. If an encapsulation type corresponding to the connection is SRv4-VXLAN, the network device b encapsulates an IPv4 header, a VXLAN header, and an SRH into the first packet.

The embodiment shown in FIG. 4 described above provides a basic procedure on a forwarding plane. Some embodiments of this application further provide a basic procedure on a control plane. The following provides detailed descriptions.

Figure 6:
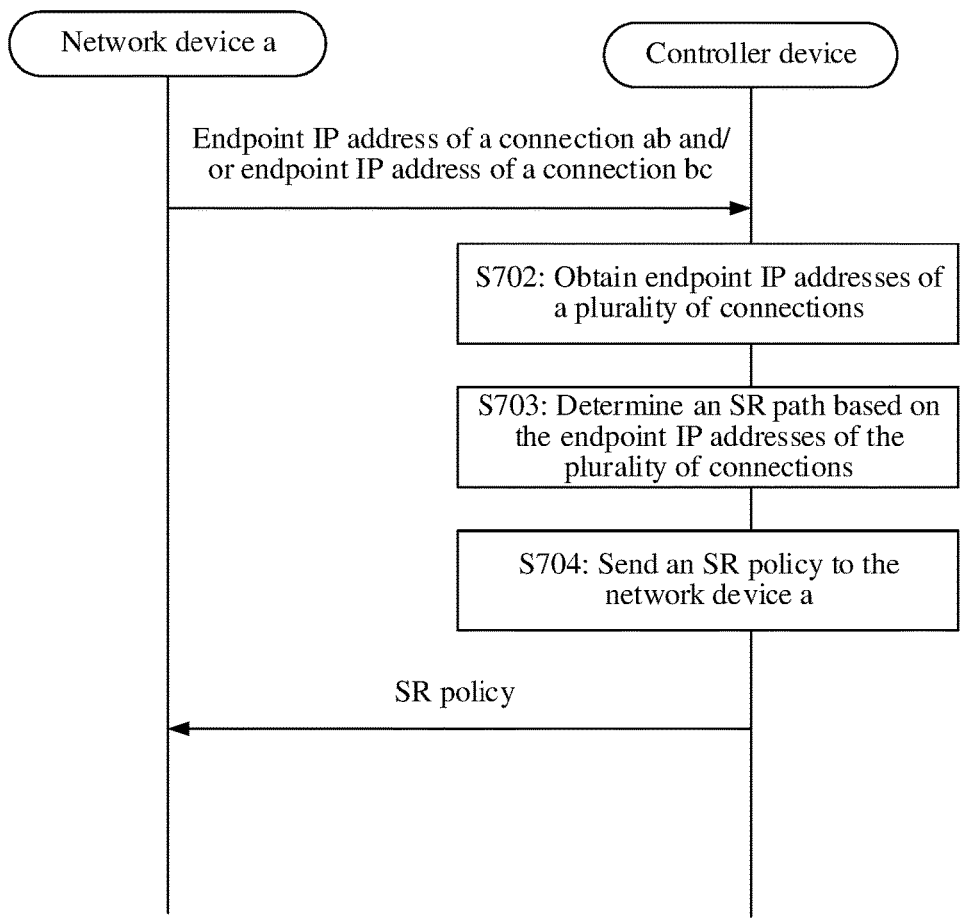
FIG. 6 is a flowchart of a path determining method according to an embodiment of this application.

FIG. 6 is a flowchart of a path determining method according to an embodiment of this application. The method shown in FIG. 6 includes the following step S702 to step S704.

Step S702: A controller device obtains endpoint IP addresses of a plurality of connections.

In some embodiments, network devices send the endpoint IP addresses of the connections to the controller device, and the controller device receives the endpoint IP addresses of the connections that are sent by the network devices, to obtain the endpoint IP addresses of the plurality of connections. The following provides example descriptions with reference to three implementations.

Implementation A: A network device acting as a source end reports an endpoint IP address of a connection to the controller device.

For example, with reference to the method shown in FIG. 4, the network device a sends the endpoint IP address of the connection ab to the controller device. The network device b sends the endpoint IP address of the connection bc to the controller device. The controller device receives the endpoint IP address of the connection ab that is sent by the network device a, and receives the endpoint IP address of the connection bc that is sent by the network device b, to obtain the endpoint IP address of the connection ab and the endpoint IP address of the connection bc.

Implementation B: A network device acting as a destination end reports an endpoint IP address of a connection to the controller device.

For example, with reference to the method shown in FIG. 4, the network device b sends the endpoint IP address of the connection ab to the controller device. The network device c sends the endpoint IP address of the connection bc to the controller device.

Implementation C: A network device acting as a source end and a network device acting as a destination end each report an endpoint IP address of a connection to the controller device, and the controller device selects an IP address from endpoint IP addresses of connections that are reported by the two network devices.

For example, with reference to the method shown in FIG. 4, the network device a sends the endpoint IP address of the connection ab to the controller device, and the network device b sends the endpoint IP address of the connection ab and the endpoint IP address of the connection bc to the controller device. The network device c sends the endpoint IP address of the connection bc to the controller device. The controller device selects, as the endpoint IP address of the connection ab, an IP address from the endpoint IP address of the connection ab that is sent by the network device a and the endpoint IP address of the connection ab that is sent by the network device b. The controller device selects, as the endpoint IP address of the connection bc, an IP address from the endpoint IP address of the connection bc that is sent by the network device b and the endpoint IP address of the connection bc that is sent by the network device c.

In some embodiments, the network device further obtains an identifier (site ID) of a site in which the network device is located, and reports the identifier of the site to the controller device. For example, the network device a is deployed in a site a, the network device b is deployed in a site b, the network device c is deployed in a site c, the network device a sends an identifier of the site a to the controller device, the network device b sends an identifier of the site b to the controller device, and the network device c sends an identifier of the site c to the controller device.

In some embodiments, the network device detects a connectivity status of a connection, and the network device further reports the connectivity status of the connection to the controller device. The connectivity status of the connection includes an up state and a down state. In a possible implementation, the network device periodically sends a probe packet to a peer end of the connection, and determines the connectivity status of the connection depending on whether a response packet returned by the peer end is received within predetermined duration.

Optionally, the network device acting as the source end reports a connectivity status of a connection to the controller device. For example, with reference to the method shown in FIG. 4, the network device a sends a connectivity status of the connection ab to the controller device. The network device b sends a connectivity status of the connection bc to the controller device. Optionally, the network device acting as the destination end reports a connectivity status of a connection to the controller device. For example, with reference to the method shown in FIG. 4, the network device b sends a connectivity status of the connection ab to the controller device. The network device c sends a connectivity status of the connection bc to the controller device. Optionally, both the network device acting as the source end and the network device acting as the destination end report connectivity statuses of connections to the controller device.

In some embodiments, the network device detects service-level agreement (SLA) information of a connection, and the network device reports the SLA information of the connection to the controller device. The SLA information of the connection includes but is not limited to at least one of a packet loss rate, a delay, jitter, or bandwidth utilization.

Optionally, the network device acting as the source end reports SLA information of a connection to the controller device. For example, with reference to the method shown in FIG. 4, the network device a sends SLA information of the connection ab to the controller device. The network device b sends SLA information of the connection bc to the controller device. Optionally, the network device acting as the destination end reports SLA information of a connection to the controller device. For example, with reference to the method shown in FIG. 4, the network device b sends SLA information of the connection ab to the controller device. The network device c sends SLA information of the connection bc to the controller device. Optionally, both the network device acting as the source end and the network device acting as the destination end report SLA information of connections to the controller device.

In some embodiments, the network device further reports a SID corresponding to a connection to the controller device. For example, with reference to the method shown in FIG. 4, the network device a sends the SID ab corresponding to the connection ab to the controller device. The network device b sends the SID bc corresponding to the connection bc to the controller device.

Optionally, when the network device establishes a plurality of connections to a plurality of peer ends, the network device sends, to the controller device, an endpoint IP address of each of the plurality of connections, a connectivity status of each of the plurality of connections, SLA information of each of the plurality of connections, and a SID corresponding to each of the plurality of connections.

In some embodiments, the network device reports various information such as the endpoint IP address of the connection, the status of the connection, the SID, and the identifier of the site to the controller device based on a BGP LS protocol. The following uses an example to describe a specific implementation of reporting the foregoing various information based on the BGP LS protocol.

In a possible implementation, a definition of a protocol identifier is extended based on RFC 7752, and a new protocol identifier is defined to support reporting of various information such as the endpoint IP address of the connection, to support a BGP SD-WAN TVC topology database. The protocol identifier is, for example, a protocol number indicating a source of topology information. Table 1 shows an extended protocol identifier, and an identifier of an SD-WAN protocol is newly added. The identifier of the SD-WAN protocol indicates that a source protocol in network layer reachability information (network layer reachability information, NLRI) (namely, various information such as the endpoint IP address of the connection and the status of the connection) in a packet is the SD-WAN protocol.

TABLE 1

| Protocol identifier | Source protocol in NLRI information |
|---|---|
| 1 | IS-IS level 1 |
| 2 | IS-IS level 2 |
| 3 | OSPFv2 |
| 4 | Direct (direct) routing |
| 5 | Static configuration (static configuration) |
| 6 | OSPFv3 |
| To be discussed (to be discussed, TBD) | SD-WAN |

For example, a process in which the network device b reports the endpoint IP address of the connection includes: The network device b generates a BGP-LS packet, where the BGP-LS packet includes the endpoint IP address of the connection bc and/or the endpoint IP address of the connection ab, and the BGP-LS packet further includes the identifier of the SD-WAN protocol. The network device b sends the BGP-LS packet to the controller device. The identifier of the SD-WAN protocol is extended, so that the controller device can identify, by using the identifier of the protocol in the BGP LS packet, that the BGP LS collects new topology data provided in this embodiment.

In some embodiments, a BGP LS node route (node route) is extended based on RFC 7752. The BGP LS node route includes the identifier of the SD-WAN protocol and an SD-WAN site identifier (SD-WAN site ID). The SD-WAN site ID is used to identify a site corresponding to a network device in an SD-WAN. Other information in the BGP LS node route reuses definitions in an existing standard. For example, content of the BGP LS node route for SD-WAN is shown in Table 2.

TABLE 2

BGP LS node routefor SD-WAN (BGP LS node route for SD-WAN)

| Parameter | Parameter description |
| --- | --- |
| Node (node) | Identify that the BGP-LS route is a node route |
| SD-WAN | Protocol collecting topology information, which is the SD-WAN herein |
| Identifier (IDENTIFIER) | Identifier of the BGP-LS in the protocol collecting topology information |
| as | BGP-LS region AS number |
| bgp-ls-identifier | BGP-LS region identifier |
| IGP-router-id | ID of a router in an IGP protocol, which is generated by the IGP protocol collecting topology information, and is a system IP address of the SD-WAN herein |
| opaque node | Opaque node attribute |
| SD-WAN-site-id | SD-WAN protocol site ID |

In some embodiments, a BGP LS link route is extended based on RFC 7752. The BGP LS link route includes the identifier of the SD-WAN protocol, a TVC status attribute, and a segment identifier attribute. The TVC status attribute is also referred to as an SD-WAN-TVC-status attribute. The TVC status attribute is used to carry a tunnel status of an SD-WAN TVC. The segment identifier attribute is also referred to as an SD-WAN-segment-id attribute. The segment identifier attribute is used to carry an SD-WAN TVC SID. For example, content of the BGP LS link route for SD-WAN is shown in Table 3.

TABLE 3

BGP LS link routefor SD-WAN (BGP LS link route for SD-WAN)

| Parameter | Parameter description |
| --- | --- |
| Link (link) | Identify that the BGP-LS route is a link route |
| SD-WAN | Protocol collecting topology information, which is the SD-WAN herein |
| Identifier (identifier) | Identifier of the BGP-LS in the protocol collecting topology information |
| Local (local) | Identify that the information is information of a local node |
| as | BGP-LS region AS number |
| BGP-LS identifier (BGP-LS-identifier) | BGP-LS region identifier |
| IGP router identifier (IGP-router-ID) | IGP protocol router ID, which is generated by the IGP collecting topology information, and is an SD-WAN system IP address herein |
| SD-WAN site ID (SD-WAN-site-id) | SD-WAN protocol site ID |
| Remote (remote) end | Identify that the information is information of a peer node |
| Local link identifier (link local identifiers) | SD-WAN TVC local TNP ID |
| Unidirectional link delay (unidirectional link delay) | SD-WAN TVC delay |
| Unidirectional link jitter (unidirectional delay variation) | SD-WAN TVC jitter |
| Unidirectional link packet loss (unidirectional link loss) | SD-WAN TVC packet loss |
| Unidirectional link utilized bandwidth (unidirectional utilized bandwidth) | SD-WAN TVC bandwidth utilization |
| Opaque link attribute (opaque link) | Opaque link attribute |
| SD-WAN TVC status (SD-WAN-TVC-status) | SD-WAN TVC up/down state |
| SD-WAN-SID (SD-WAN-segment-ID) | SD-WAN TVC SID |
| SD-WAN value-added service capability (sdwan-vas-capability) | SD-WAN value-added service capability set |

Step S703: The controller device determines an SR path based on the endpoint IP addresses of the plurality of connections.

For example, nodes in the SR path include the network device a, the network device b, and the network device c. Connections in the SR path include the connection ab and the connection bc.

Optionally, the controller device performs path computation by using a site as an object, instead of performing path computation by using a single network device as an object. The following describes features related to path computation performed by using a site as an object.

For example, in step S702, the controller device specifically obtains endpoint IP addresses of connections between different sites in a plurality of sites. In step S703, the controller device determines an SR path based on the endpoint IP addresses of the plurality of connections by using sites as path orchestration objects. An endpoint in an SR policy sent by the controller device in step S704 corresponds to a site. Optionally, a value of the endpoint in the SR policy may be an identifier of the site instead of an IP address of a specific device.

When one site includes a plurality of network devices, each network device in a same site sends an endpoint IP address of a connection established by the network device and an identifier of the site to the controller device. Site identifiers reported by all network devices in a same site are the same. Optionally, endpoint IP addresses of connections that are reported by different network devices in a same site are different. The controller device performs path computation by considering a plurality of network devices in a same site as one node.

Optionally, the controller device selects a connection from connections established by different network devices in a same site, to perform path computation. For example, a network includes a site 1 and a site 2, the site 1 includes a network device a and a network device b, and the site 2 includes a network device c and a network device d. The controller device determines, based on topology information reported by the network device, that the network includes four connections. The four connections are a connection from the network device a to the network device c, a connection from the network device a to the network device d, a connection from the network device b to the network device c, and a connection from the network device b to the network device d. The controller device selects a connection from the four connections based on a specified constraint to perform orchestration. The constraint is, for example, an SLA requirement on a path. The SLA requirement includes but is not limited to requirements that a delay is less than specified duration, a packet loss rate is less than a specified packet loss rate, jitter is less than a specified value, bandwidth utilization is greater than specified bandwidth utilization, and the like.

In a possible implementation, user equipment obtains a path computation intention set by a user, and the user equipment sends the path computation intention to the controller device. The controller device receives the path computation intention sent by the user equipment. The controller device performs path computation based on the path computation intention set by the user. The path computation intention includes a source site, a destination site, and a constraint. The controller device selects, from a TVC topology database, a plurality of TVCs that meet the path computation intention, and generates an SR path by using the plurality of selected TVCs.

Figure 7:
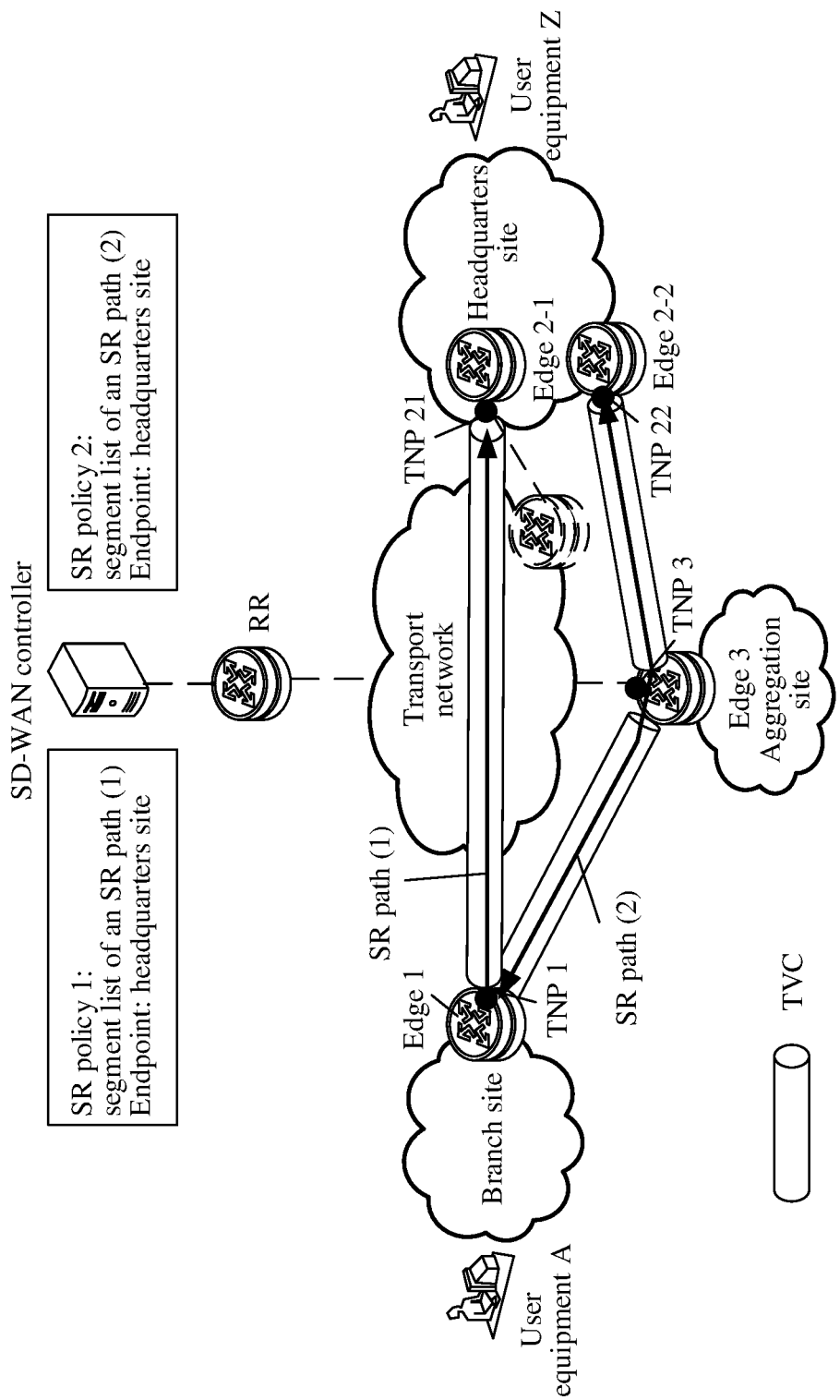
FIG. 7 is a schematic diagram of computing an SR path in an overlay network according to an embodiment of this application.

FIG. 7 is a schematic diagram of computing an SR path in an overlay network. As shown in FIG. 7, a headquarters site includes an edge 2-1 and an edge 2-2. A branch site includes an edge 1. An aggregation site includes an edge 3. A TVC is established between a TNP 1 on the edge 1 and a TNP 21 on the edge 2-1. A SID corresponding to the TVC between the edge 1 and the edge 2-1 is a SID 1021. A TVC is established between the TNP 1 on the edge 1 and a TNP 3 on the edge 3. A SID corresponding to the TVC between the edge 1 and the edge 3 is a SID 103. A TVC is established between the TNP 3 on the edge 3 and a TNP 22 on the edge 2-2. A SID corresponding to the TVC between the edge 3 and the edge 2-2 is a SID 3022. The edge 2-1, the edge 2-2, the edge 1, and the edge 3 separately report topology information of TVCs to the controller device. The controller device performs policy orchestration based on the topology information of the TVCs. Specifically, in the path computation intention, the source site is the branch site, the destination site is the headquarters site, and the constraint is that a delay is less than specified duration or a packet loss rate is less than a specified packet loss rate. The controller device computes an SR path from the branch site to the headquarters site based on the topology information of the TVCs and the path computation intention, to obtain two SR paths. The two SR paths computed by the controller device are an SR path (1) and an SR path (2). The SR path (1) includes the TVC from the edge 1 to the edge 2-1. The SR path (1) meets the constraint that a delay is less than specified duration. The SR path (2) includes the TVC from the edge 1 to the edge 3 and the TVC from the edge 3 to the edge 2-2. The SR path (2) meets the constraint that a packet loss rate is less than a specified packet loss rate. The controller device generates an SR policy 1 and an SR policy 2 based on the path computation result. The SR policy 1 includes a segment list of the SR path (1). The SR policy 2 includes a segment list of the SR path (2). Specific content of the SR policy 1 is shown in Table 4, and specific content of the SR policy 2 is shown in Table 5.

TABLE 4

SD-WAN SR policy 1: Low-delay policy from a branch to headquarters

| Color | 10 |
|---|---|
| Endpoint | Headquarters site |
| Candidate path | 1 |
| Preference | 100 |
| Segment list | <1021> |

TABLE 5

SD-WAN SR policy 2: Low-packet loss rate policy from a branch to headquarters

| Color | 20 |
|---|---|
| Endpoint | Headquarters site |
| Candidate path | 1 |
| Preference | 50 |
| Segment list | <103, 3022> |

Optionally, after the network device sends the status of the connection to the controller device, the network device further detects the status of the connection. If a status of a connection on the network device is updated, the network device sends an updated status of the connection to the controller device. The controller device updates, based on the updated status of the connection that is reported by the network device, topology data stored in the topology database, and recalculates the SR policy based on updated topology data. Update to the status of the connection includes but is not limited to update of the connectivity status of the connection from the up state to the down state, update of the connectivity status of the connection from the down state to the up state, and change of SLA information of the connection (for example, decrease of an SLA or increase of an SLA).

For example, the network device performs connectivity status detection on each TVC established by the network device. If a status of a TVC is updated from the up state to the down state due to a physical network link fault, the network device sends a BGP-LS packet to the controller device. The BGP-LS packet indicates that the TVC is in the down state. After the controller device receives the BGP-LS packet, the controller device updates the status of the TVC in the topology database to the down state, and makes an SR path including the TVC ineffective, or withdraws the SR path including the TVC, or re-computes a new SR path.

In a conventional SD-WAN solution, there is no end-to-end path status perception. When a TVC is faulty or quality of the TVC deteriorates, a network device other than two network devices of the TVC cannot detect the fault or the quality deterioration of the TVC. As a result, traffic is discarded during forwarding. However, in this embodiment, the network device performs connectivity status detection or SLA detection on each TVC established by the network device, and reports a status of the TVC to the controller device after the status of the TVC is updated, so that the controller device can perceive the status of each TVC in the SR path in a timely manner, thereby implementing end-to-end path status perception. If a TVC in an SR path is faulty or quality of the TVC deteriorates, the controller device can import traffic into another SR path by making the SR path ineffective, withdrawing the SR path, or re-computing an SR path, to prevent the traffic from being discarded during forwarding.

Step S704: The controller device sends the SR policy to the network device a.

The controller device generates the SR policy based on the determined SR path. The SR policy indicates the SR path. The SR policy includes a color, an endpoint, one or more candidate paths, a preference, and a segment list. The segment list in the SR policy includes one or more SIDs. Each SID indicates one connection. For example, the SR policy includes the SID ab corresponding to the connection ab and the SID bc corresponding to the connection bc. In some embodiments, the SR policy is applied to the SD-WAN, the segment list in the SR policy indicates a path in an overlay network in the SD-WAN, and the SR policy is also referred to as an SD-WAN policy. Optionally, the controller sends the SR policy based on a BGP SR policy.

In a possible implementation, the controller device sends the SR policy to the network device a based on a fact that a head end in the SR path is the network device a. After the network device a receives the SR policy, the network device a obtains the segment list from the SR policy, and the SR policy uses the segment list to perform the method shown in FIG. 4.

The following uses an example to describe the foregoing embodiment with reference to a specific application scenario. In the following application scenario, a network device is an edge device, and a connection between network devices is a TVC.

The following describes a process of dynamically establishing a TVC and assigning a SID.

Figure 8:
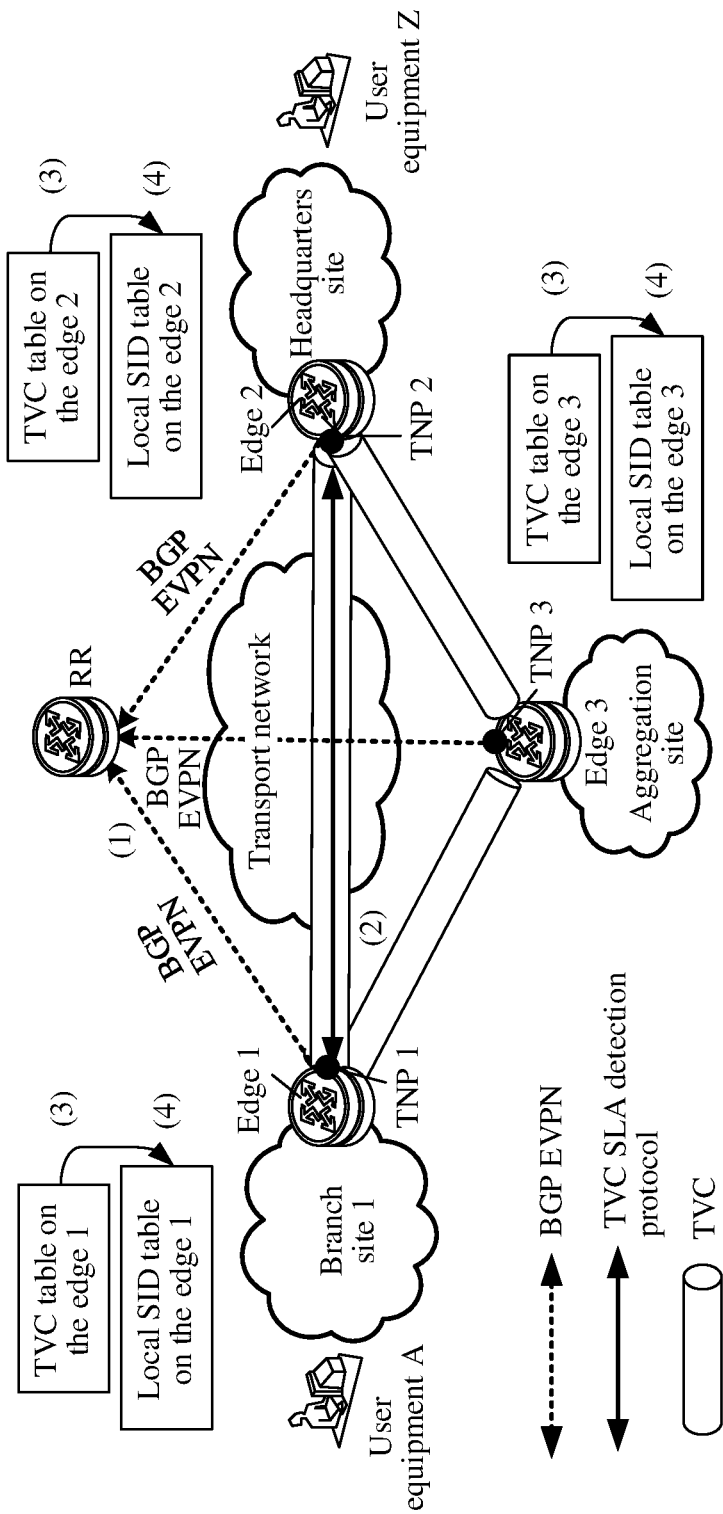
FIG. 8 is a schematic diagram of establishing a TVC according to an embodiment of this application.

FIG. 8 is a schematic diagram of establishing a TVC. As shown in FIG. 8, a TVC establishment process includes step (1) to step (4).

Step (1): All edge devices establish BGP sessions with an RR. The edge device transmits TNP routing information by using a BGP SD-WAN protocol. A dynamic TVC is established between edge devices. As shown in FIG. 8, an edge 1 in a branch site establishes a unidirectional tunnel table (a TVC table, namely, an entry about a connection) from the branch site to a headquarters site through pairing of a local TNP 1 and a TNP 2 in the headquarters site. The edge 1 establishes a TVC table through pairing of the local TNP 1 and a TNP 3 in an aggregation site. Similarly, the headquarters site of an enterprise separately establishes a TVC from the headquarters site to the branch site and a TVC from the headquarters site to the aggregation site. The aggregation site establishes a TVC from the aggregation site to the branch site and a TVC from the aggregation site to the headquarters site. Each edge device locally stores a TVC to form a distributed TVC database.

Step (2): The edge device automatically deploys an SLA detection protocol on the TVC. The edge device detects a connectivity status of the TVC and an SLA status (a packet loss rate, a delay, and jitter) of the TVC. The edge device periodically stores the connectivity status of the TVC and the SLA information of the TVC in the TVC database.

For example, content of a TVC database on the edge 1 is shown in Table 6.

TABLE 6

| | TVC database on the edge 1 | | | | | |
|---|---|---|---|---|---|---|
| ID | Destination site | Source TNP | Destination TNP | Status | SLA (packet loss rate/delay/jitter) | SID |
| TVC 1-2 | Headquarters site | TNP 1 | TNP 2 | up | 6% / 5 ms/ 1 ms | 102 |
| TVC 1-3 | Aggregation site | TNP 1 | TNP 3 | up | 2% / 7 ms/ 1 ms | 103 |

For example, content of a TVC database on an edge 2 is shown in Table 7.

TABLE 7

| | TVC database on the edge 2 | | | | | |
|---|---|---|---|---|---|---|
| ID | Destination site | Source TNP | Destination TNP | Status | SLA (packet loss rate/delay/jitter) | SID |
| TVC 2-1 | Branch | TNP 2 | TNP 1 | up | 6% / 5 ms/ 1 ms | 201 |
| TVC 2-3 | Aggregation | TNP 2 | TNP 3 | up | 2% / 4 ms/ 2 ms | 203 |

For example, content of a TVC database on an edge 3 is shown in Table 8.

TABLE 8

| | TVC database on the edge 3 | | | | | |
|---|---|---|---|---|---|---|
| ID | Destination site | Source TNP | Destination TNP | Status | SLA (packet loss rate/delay/jitter) | SID |
| TVC 3-1 | Branch | TNP 3 | TNP 1 | up | 3% / 7 ms/ 1 ms | 301 |
| TVC 3-2 | Headquarters | TNP 3 | TNP 2 | up | 2% / 4 ms/ 2 ms | 302 |

Step (3): The edge device dynamically assigns, to each TVC by using a BGP EVPN, a SID that is unique in an entire network. Optionally, the SID has a plurality of forms, for example, an MPLS-like label, an SRv6 SID address form, or a label format obtained by concatenating an identifier of a source site+an ID of a source TNP+an identifier of a destination site+an ID of a destination TNP. Optionally, the SID is assigned by a source node of a TVC. As shown in FIG. 8, the edge 1 in the branch site assigns a SID 102 to a TVC from the branch site to the headquarters site, and the edge 1 assigns a SID 103 to a TVC from the branch site to the aggregation site. The edge 2 in the headquarters site of the enterprise assigns a SID 201 and a SID 203 to the TVC from the headquarters site to the branch site and a TVC from the headquarters site to the aggregation site. The edge 3 in the aggregation site assigns a SID 301 and a SID 302 to a TVC from the aggregation site to the branch site and a TVC from the aggregation site to the headquarters site.

Step (4): The edge device sets a SID type of each SID to customized End.X-SD-WAN, and stores a correspondence between a SID, a SID type, and an outbound interface in a local SID table.

For example, content of a local SID table on the edge 1 is shown in Table 9.

TABLE 9

| Local SID table on the edge 1 | | |
|---|---|---|
| SID | SID type | Outbound interface |
| 102 | End.X-SD-WAN | TVC 1-2 |
| 103 | End.X-SD-WAN | TVC 1-3 |

For example, content of a local SID table on the edge 2 is shown in Table 10.

TABLE 10

| Local SID table on the edge 2 | | |
|---|---|---|
| SID | SID type | Outbound interface |
| 201 | End.X-SD-WAN | TVC 2-1 |
| 203 | End.X-SD-WAN | TVC 2-3 |

For example, content of a local SID table on the edge 3 is shown in Table 11.

TABLE 11

| Local SID table on the edge 3 | | |
|---|---|---|
| SID | SID type | Outbound interface |
| 301 | End.X-SD-WAN | TVC 3-1 |
| 302 | End.X-SD-WAN | TVC 3-2 |

The following describes a topology collection and reporting process in the foregoing scenario.

Figure 9:
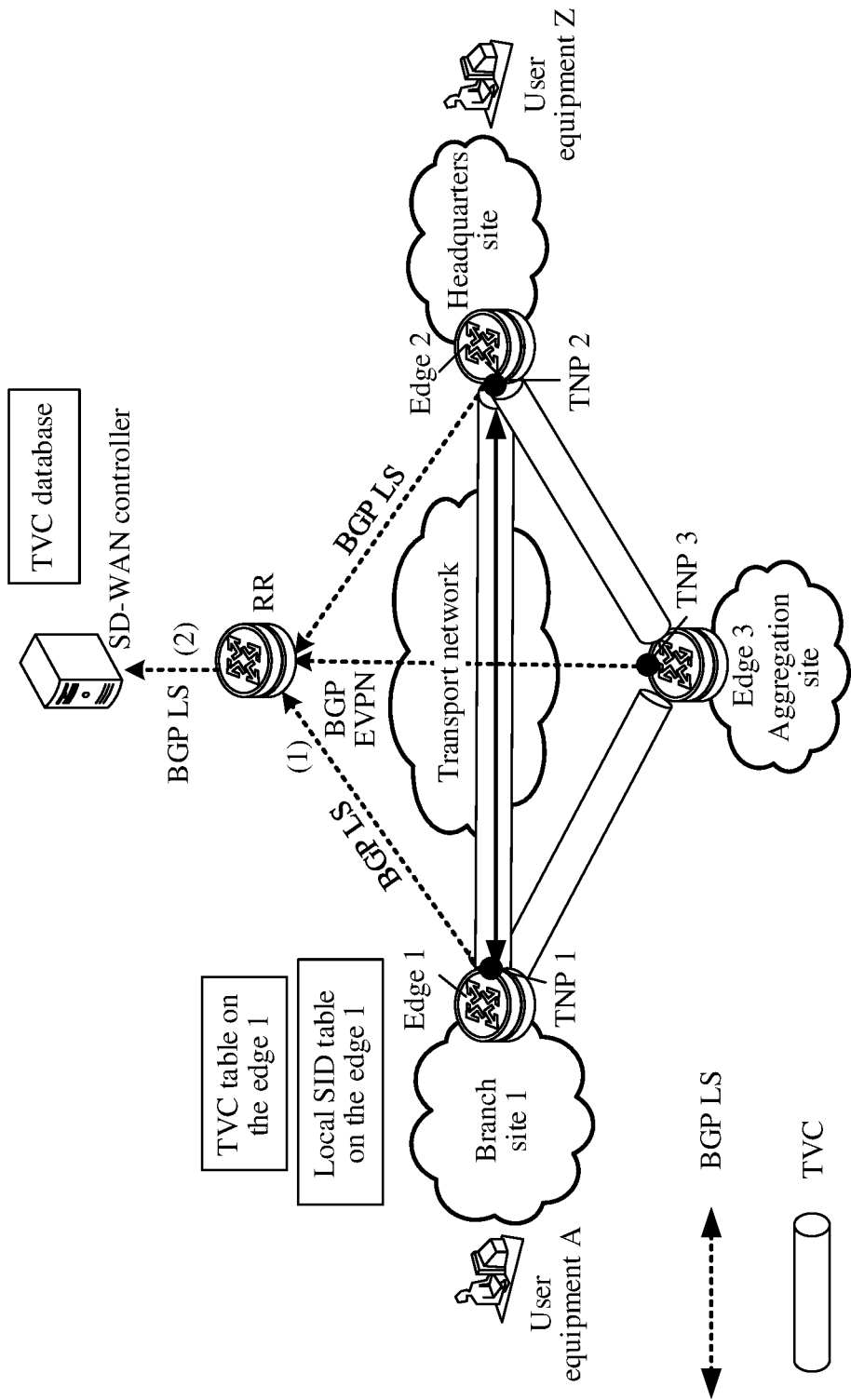
FIG. 9 is a schematic diagram of topology collection and reporting according to an embodiment of this application.

FIG. 9 is a schematic diagram of topology collection and reporting according to an embodiment of this application. The topology collection and reporting process includes the following step (1) and step (2).

Step (1): Deploy a BGP LS protocol between an edge device and an RR. The edge device performs protocol interoperability with a BGP EVPN by using a BGP LS protocol extension. The edge device collects TVC information from the BGP EVPN, and reports the TVC information to the RR. The TVC information includes but is not limited to basic encapsulation information (for example, an IP address), a SID, a status, an SLA, and bandwidth utilization of a TVC.

Step (2): Also deploy the BGP LS protocol between the RR and a controller device. The RR reports the TVC information to the controller device by using a BGP LS protocol extension. The controller device receives and stores the TVC information reported by the RR. The controller device creates a TVC topology database based on the TVC information reported by the RR, to compute a global SR path by using the TVC topology database.

For example, content of the TVC topology database created by the controller device is shown in Table 12.

TABLE 12

| TVC DB | | | | | | |
|---|---|---|---|---|---|---|
| Source site | Source TNP | Destination site | Destination TNP | Status | SLA (packet loss rate/delay/jitter) | SID |
| Headquarters | TNP 2 | Branch | TNP 1 | up | 6% / 5 ms/ 1 ms | 201 |
| Headquarters | TNP 2 | Aggregation | TNP 3 | up | 2% / 4 ms/ 2 ms | 203 |
| Aggregation | TNP 3 | Branch | TNP 1 | up | 2% / 7 ms/ 1 ms | 301 |
| Aggregation | TNP 3 | Headquarters | TNP 2 | up | 2% / 4 ms/ 2 ms | 302 |
| Branch | TNP 1 | Aggregation | TNP 2 | up | 6% / 5 ms/ 1 ms | 102 |
| Branch | TNP 1 | Headquarters | TNP 3 | up | 2% / 7 ms/ 1 ms | 103 |

The following describes an SR policy delivery process in the foregoing scenario.

Figure 10:
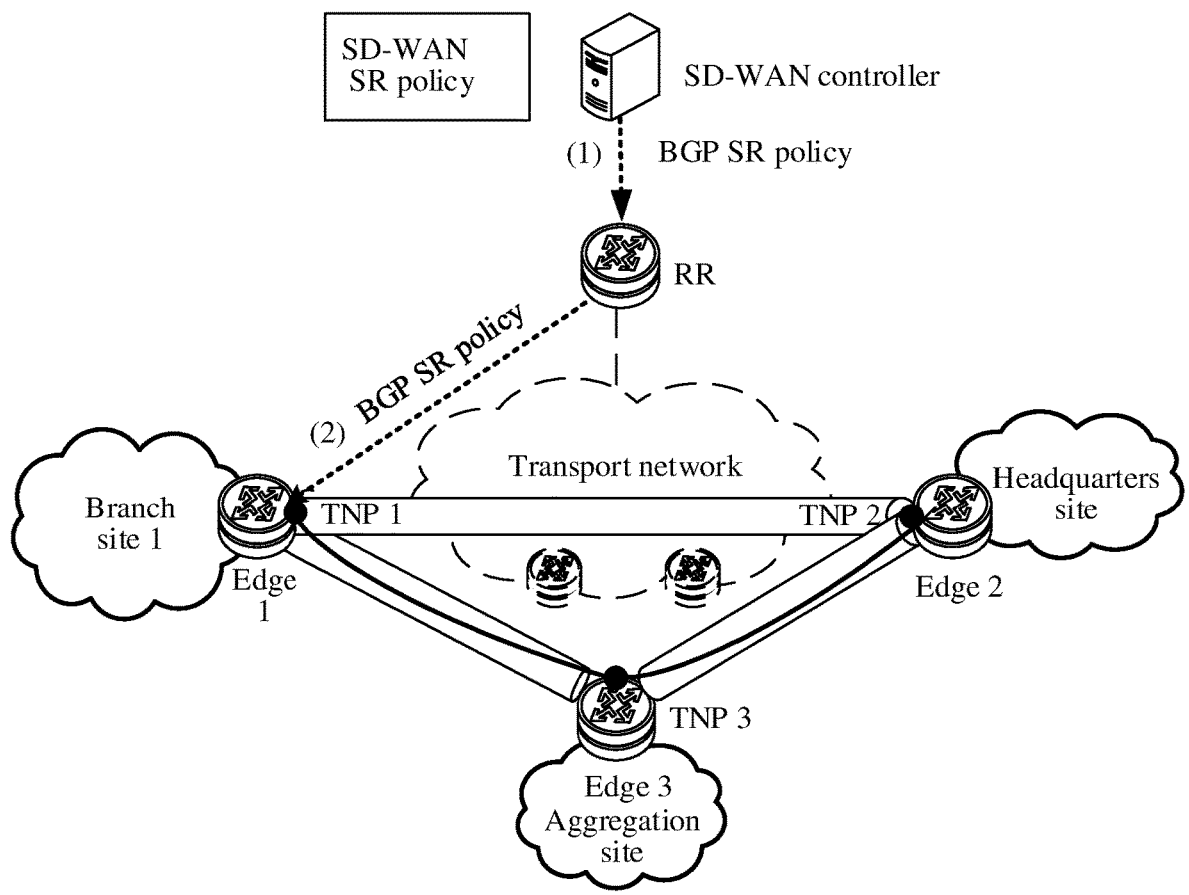
FIG. 10 is a schematic diagram of delivering an SR policy by a controller device according to an embodiment of this application.

FIG. 10 is a schematic diagram of delivering an SR policy by a controller device according to an embodiment. In FIG. 10, an edge 1 is a head end of an SR path, and the edge 1 is an example of a network device a. As shown in FIG. 10, the controller device uses a BGP SR policy to deliver an SR policy of an SD-WAN. Content of the SR policy is compatible with an original SRv6 policy to the greatest extent. A process in which the controller device delivers the SR policy specifically includes the following step (1) and step (2).

Step (1): Deploy a BGP SR policy protocol between the controller device and an RR. The controller device delivers the SR policy of the SD-WAN to the RR by using a BGP SR policy protocol extension.

For example, the controller device delivers two SR policies shown in Table 13 and Table 14.

TABLE 13

| SD-WAN SR policy: Low-delay policy from a branch site to a headquarters site | |
|---|---|
| Color | 10 |
| Endpoint | Headquarters |
| Candidate path | 1 |
| Preference | 100 |
| Segment list | <102> |

TABLE 14

| SD-WAN SR policy: Low-packet loss rate policy from a branch site to a headquarters site | |
|---|---|
| Color | 20 |
| Endpoint | Headquarters |
| Candidate path | 1 |
| Preference | 50 |
| Segment list | <103, 302> |

Step (2): Also deploy the BGP SR policy protocol between the RR and an edge device. The RR delivers the SR policy of the SD-WAN to the head end edge device by using a BGP SR policy protocol extension.

The following provides example descriptions of the methods shown in FIG. 4 and FIG. 6 with reference to five specific instances.

For network architectures in the following Instance 1 to Instance 5, refer to FIG. 11. A head end edge 1 in the following Instance 1 to Instance 5 is the network device a in the methods shown in FIG. 4 and FIG. 6, an intermediate node edge 3 in the following Instance 1 to Instance 5 is the network device b in the methods shown in FIG. 4 and FIG. 6, and a tail end edge 2 in the following Instance 1 to Instance 5 is the network device c in the methods shown in FIG. 4 and FIG. 6. A TVC 1-3 in the following Instance 1 to Instance 5 is the connection ab in the methods shown in FIG. 4 and FIG. 6, and a TVC 3-2 in the following Instance 1 to Instance 5 is the connection bc in the methods shown in FIG. 4 and FIG. 6. A SID 302 in the following Instance 1 to Instance 5 is the SID bc in the methods shown in FIG. 4 and FIG. 6, and a SID 103 in the following Instance 1 to Instance 5 is the SID ab in the methods shown in FIG. 4 and FIG. 6. IP 1 and IP 3 in the following Instance 1 to Instance 5 are the endpoint IP address of the connection ab in the methods shown in FIG. 4 and FIG. 6. IP 3 and IP 2 in the following Instance 1 to Instance 5 are the endpoint IP address of the connection bc in the methods shown in FIG. 4 and FIG. 6.

Instance 1

Figure 12:
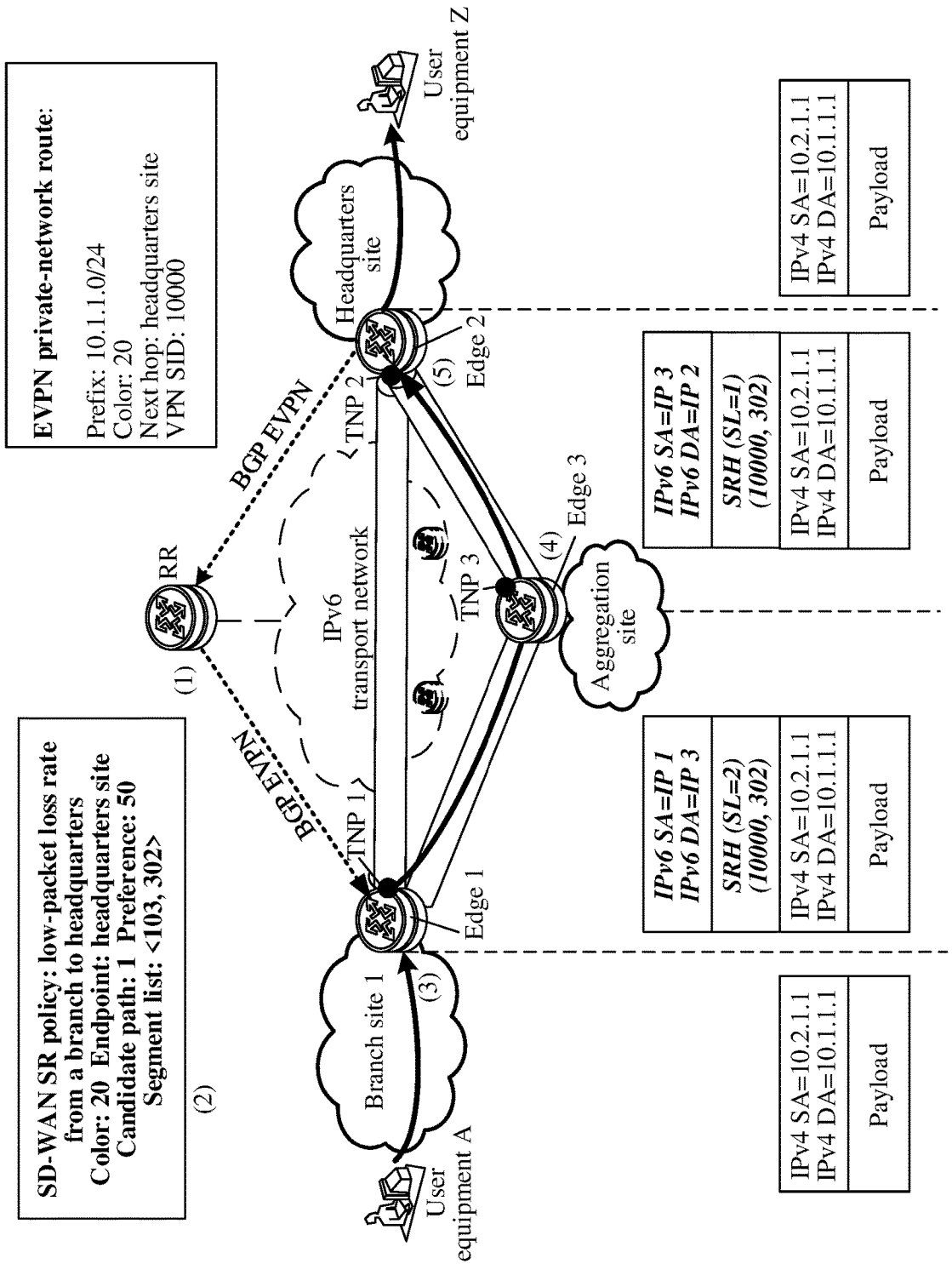
FIG. 12 is a schematic diagram of importing a service into an SD-WAN SRv6 tunnel and forwarding the service according to an embodiment of this application.

Instance 1 uses EVPNv4 as an example to describe a forwarding processing procedure of constructing an SD-WAN SRv6 tunnel in an IPv6 transport network for traffic. FIG. 12 is a schematic diagram of importing a service into an SD-WAN SRv6 tunnel and forwarding the service in Instance 1. As shown in FIG. 12, Instance 1 includes the following step (1) to step (5).

Step (1): The tail end edge 2 advertises a private-network route of a local user by using a BGP EVPN. An RR receives the EVPN private-network route advertised by the tail end edge 2. The RR reflects the EVPN private-network route to the head end edge 1. The EVPN private-network route includes information such as a route prefix, a VPN SID, a color, and a next hop. For example, the route prefix in the EVPN private-network route is 10.1.1.0/24. For example, the VPN SID in the EVPN private-network route is 10000. For example, the color in the EVPN private-network route is 20. For example, the next hop in the EVPN private-network route is a site identifier of a headquarters site.

Step (2): A controller device has delivered different SD-WAN SRv6 policies to the head end edge 1 in advance. The head end edge 1 learns, from the RR through step (1), the EVPN private-network route advertised by the tail end edge 2. The head end edge 1 obtains an SR policy named "low-packet loss rate from a branch to headquarters" through iteration based on the color and the next hop that are carried in the EVPN private-network route.

Step (3): When the head end edge 1 receives traffic from a user A (an IPv4 address of the user A is 10.2.1.1) to a user Z (the IPv4 address of the user Z is 10.1.1.1) at the headquarters site, the head end edge 1 queries a private-network route based on a destination address of a data packet in the traffic, to determine that the traffic needs to be imported into the SD-WAN SR tunnel for forwarding. The head end edge 1 obtains a segment list <103, 302> and a VPN SID 10000 from the SR policy. The head end edge 1 adds an SRH label stack (10000, 302, 103) to the data packet, and the head end edge 1 performs matching on a local SID table based on the topmost SID 103. The head end edge 1 finds that an endpoint behavior corresponding to the SID 103 in the local SID table is End.X-SD-WAN, and an outbound interface corresponding to the SID 103 is the TVC 1-3. Therefore, the head end edge 1 obtains information about the TVC 1-3, and adds an SR tunnel encapsulation layer (namely, an outer-layer IPv6 header and an SRH) to the data packet based on the information about the TVC 1-3.

The information about the TVC 1-3 includes an interface IP address (IP 1) corresponding to a source TNP 1 of the TVC 1-3 and an interface IP address (IP 3) of a destination TNP 3 of the TVC 1-3. In the outer-layer IPv6 header, a source address is IP 1, and a destination address is IP 3. Then the head end edge 1 enables the SID 103 to pop up. A packet obtained after the SID 103 pops up carries an SRH label stack (10000, 302). The head end edge 1 sends the packet to the intermediate node edge 3 through a link corresponding to the TNP 1.

In some embodiments, the information about the TVC 1-3 on the head end edge 1 comes from a TNP route advertised by the intermediate node edge 3. Specifically, the intermediate node edge 3 advertises the TNP route in advance, and the TNP route includes the IP address (IP 3) of the TNP 3. The head end edge 1 receives the TNP route advertised by the intermediate node edge 3, and obtains the IP address of the TNP 3 from the TNP route. The head end edge 1 stores a correspondence between an identifier of the TVC 1-3, an IP address of the TNP 1, and the IP address of the TNP 3 in a TVC table. For example, the head end edge 1 creates an entry in the TVC table, and content of the entry includes: ID: TVC 1-3; destination site: aggregation site; IP address of the source TNP: IP 1; and IP address of the destination TNP: IP 3. The head end edge 1 queries, based on the TVC 1-3, the IP address of the source TNP and the IP address of the destination TNP corresponding to the TVC 1-3, to obtain IP 1 and IP 3.

Step (4): After the intermediate node edge 3 receives the packet sent by the head end edge 1, the intermediate node edge 3 obtains, from the SRH header, the topmost SID (namely, the SID 302) indicated by an SL field. The intermediate node edge 3 performs a query in a local SID table based on the SID 302, and finds that an endpoint behavior corresponding to the SID 302 in the local SID table is End.X-SD-WAN, and a sending tunnel corresponding to the SID 302 is the TVC 3-2. The intermediate node edge 3 modifies both the source IP address and the destination IP address of the packet based on encapsulation information of the TVC 3-2. The intermediate node edge 3 forwards a modified packet to the tail end edge 2 through a physical link corresponding to the TVC 3-2.

Step (5): The tail end edge 2 receives the packet sent by the intermediate node edge 3. The tail end edge 2 searches a local SID table based on a remaining VPN SID 10000 of the SRH in the packet, and determines that the VPN SID 10000 matches End.DT4 SID. The tail end edge 2 performs SR tunnel decapsulation processing on the packet, and removes the SRH and the outer-layer IPv6 packet header from the packet. The tail end edge 2 searches for a corresponding VPN instance private-network route based on a destination IP address (10.1.1.1) of an inner-layer packet, and sends the route to a host Z. In this way, control over an end-to-end SR forwarding path of A→the edge 1→the edge 3→the edge 2→Z is implemented.

Instance 1 describes how to construct an SD-WAN SRv6 tunnel in an IPv6 underlay transport network. When the underlay transport network is an IPv4 network, tunnel encapsulation needs to be further improved to implement an SD-WAN SRv4 tunneling technology. The SD-WAN SRv4 tunnel encapsulation includes a plurality of types (such as GRE/VXLAN). The following uses GRE as an example to describe a method for importing a service into an SD-WAN SRv4 tunnel and forwarding the service. For details, refer to Instance 2.

Instance 2

Figure 13:
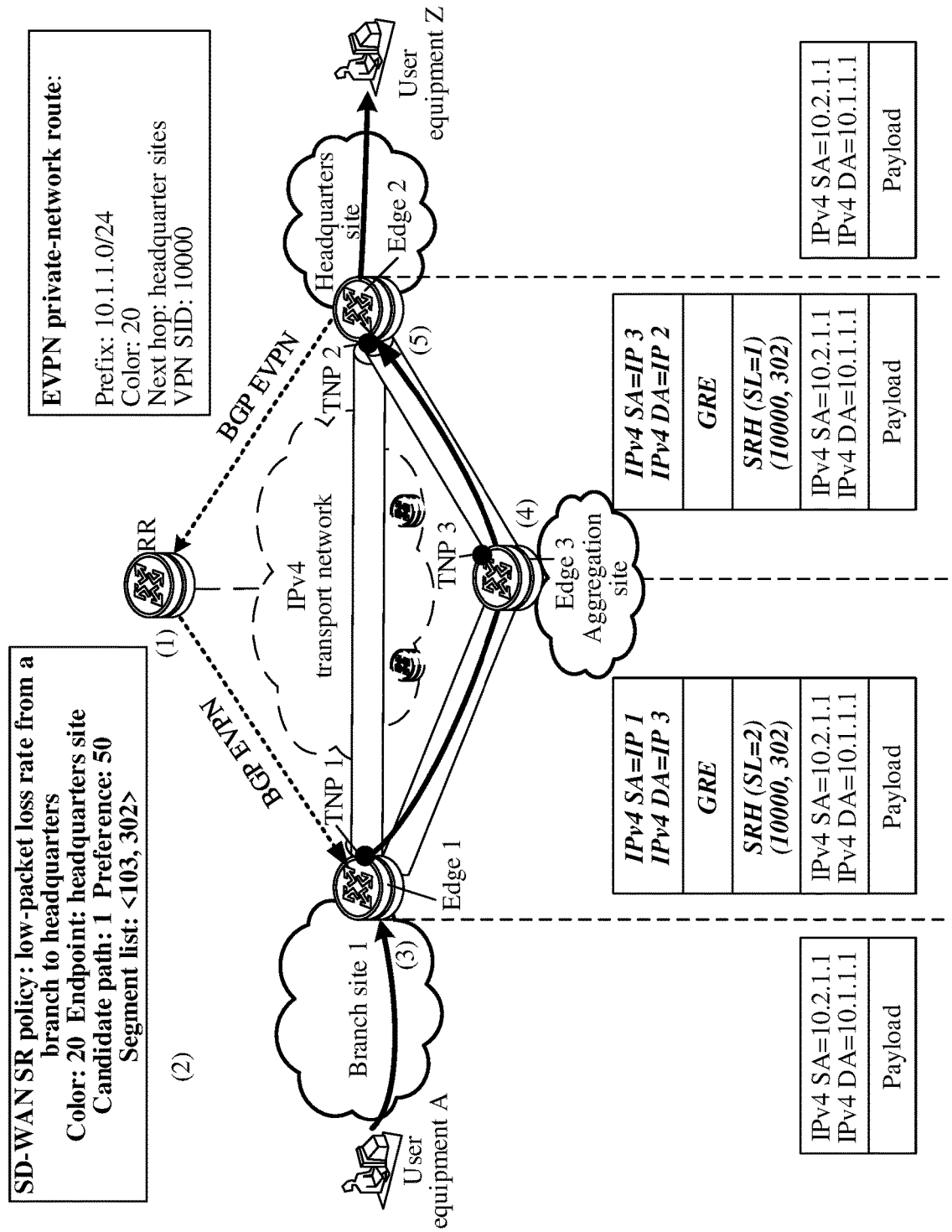
FIG. 13 is a schematic diagram of importing a service into an SD-WAN SRv4 tunnel and forwarding the service according to an embodiment of this application.

Instance 2 is a method for importing, based on GRE, a service into an SD-WAN SRv4 tunnel and forwarding the service provided in an embodiment of this application. FIG. 13 is a flowchart of Instance 2. As shown in FIG. 13, Instance 2 includes step (1) to step (5).

For step (1) and step (2) of Instance 2, refer to step (1) and step (2) of Instance 1. A difference lies in that, when an edge device generates a TVC, the edge device defines a TVC encapsulation type as SRv4-GRE based on a fact that a TNP type is IPv4 GRE. In addition, if a TNP type is IPv4 VXLAN, the edge device defines a TVC encapsulation type as SRv4-VXLAN.

Step (3): When the head end edge 1 receives traffic sent by a user A (10.2.1.1) to a user Z (10.1.1.1) at the headquarters site, the head end edge 1 performs matching on a local SID table based on the topmost SID 103, and finds that an outbound interface corresponding to the SID 103 is the TVC 1-3. The head end edge 1 adds a GRE header and an SRH to a data packet based on a fact that a TVC encapsulation type corresponding to the TVC 1-3 is SRv4-GRE, and sends the packet into which the GRE header and the SRH are encapsulated to the intermediate node edge 3 through an interface corresponding to the TVC 1-3.

Step (4): After the intermediate node edge 3 receives the packet, the intermediate node edge 3 decapsulates an SRv4-GRE tunnel header. The intermediate node edge 3 identifies the SRH header based on a payload protocol field in GRE, and then the intermediate node edge 3 obtains, from the SRH, the topmost SID 302 indicated by an SL field. The intermediate node edge 3 performs a query in a local SID table based on the SID 302, and finds that an endpoint behavior corresponding to the SID 302 is End.X-SD-WAN, and a specified sending tunnel is the TVC 3-2. The intermediate node edge 3 encapsulates the SRv4-GRE tunnel header into the packet based on encapsulation information of the TVC 3-2.

Step (5): After the tail end edge 2 receives the packet, the tail end edge 2 decapsulates the SRv4-GRE tunnel header, and searches a local SID table based on a remaining VPN SID of the SRH, to obtain the End.DT4 SID through matching. The tail end edge 2 removes the SRH and the GRE packet header. The tail end edge 2 searches for a corresponding VPN instance private-network route based on an IP address (10.1.1.1) of an inner-layer packet, and sends the route to a host Z. In this way, control over an end-to-end SR forwarding path of A→the edge 1→the edge 3→the edge 2→Z is implemented.

When an SD-WAN underlay transport network includes a plurality of different region networks that separately support IPv4 or IPv6, an end-to-end heterogeneous SD-WAN overlay SR tunnel can be implemented through combination by using the methods described in Instance 1 and Instance 2. The following provides detailed descriptions by using Instance 3.

Instance 3

Instance 3 is an SD-WAN SRv6 and SRv4 hybrid tunnel forwarding method provided in an embodiment.

Figure 14:
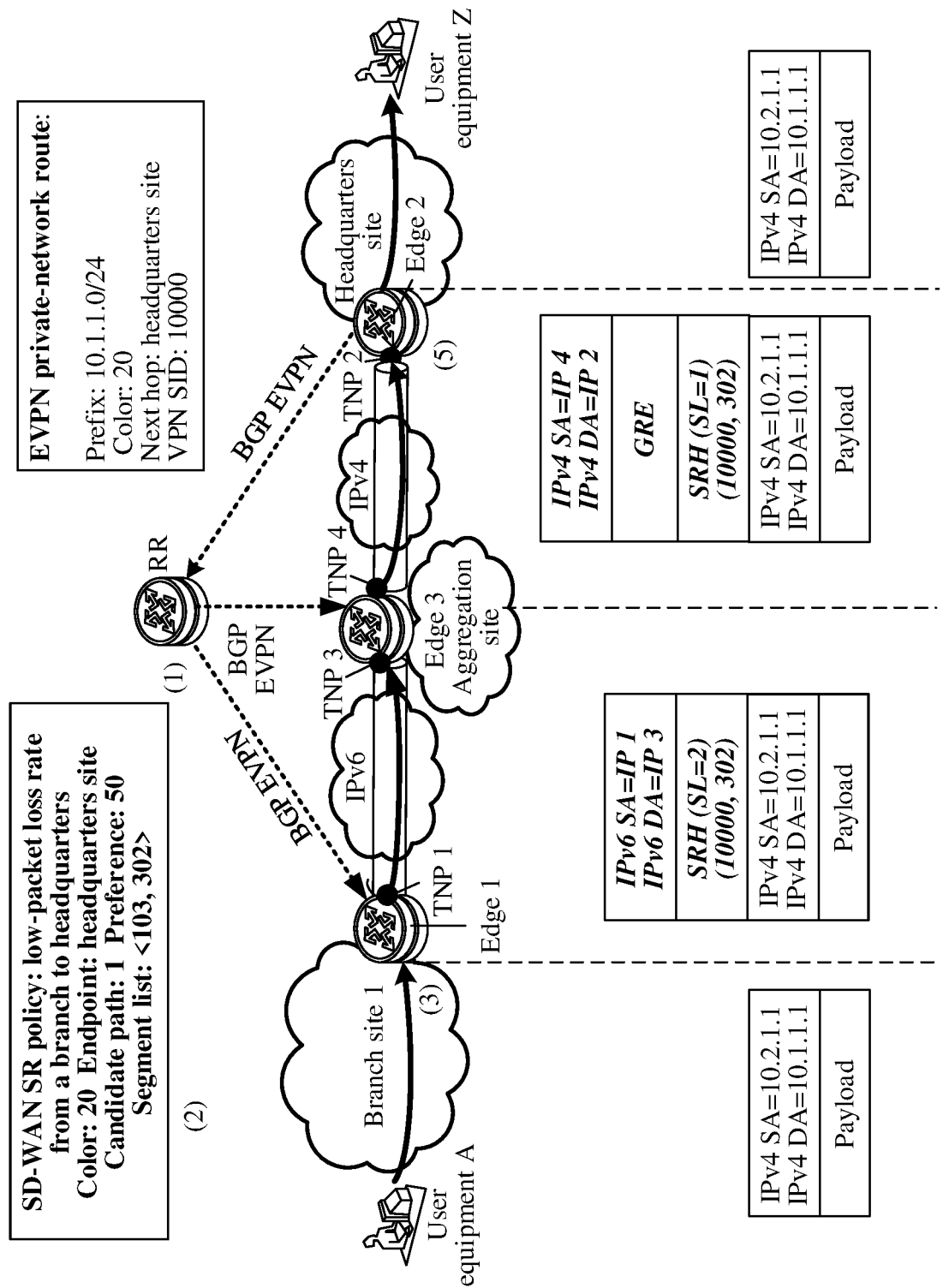
FIG. 14 is a schematic diagram of an SD-WAN SRv6 and SRv4 hybrid tunnel forwarding method according to an embodiment of this application.

FIG. 14 is a flowchart of Instance 3. Instance 3 includes step (1) to step (5). For step (1) to step (5) of Instance 3, refer to step (1) to step (5) of Instance 1 and Instance 2. A difference lies in that in step (3) of Instance 3, the intermediate node edge 3 performs conversion between an SRv6 tunnel encapsulation format and an SRv4 tunnel encapsulation format in the following Implementation (1) or Implementation (2).

Implementation (1): The intermediate node edge 3 performs conversion from an SRv6 tunnel encapsulation format to an SRv4 tunnel encapsulation format. Specifically, the intermediate node edge 3 receives the packet sent by the edge 1, the intermediate node edge 3 decapsulates an SRv6 tunnel header, and the intermediate node edge 3 obtains, from the SRH, the topmost SID (the SID 302) indicated by an SL field. The intermediate node edge 3 performs a query in a local SID table based on the SID 302, and finds that an endpoint behavior corresponding to the SID 302 is End.X-SD-WAN, and a sending tunnel corresponding to the SID 302 is the TVC 3-2. The intermediate node edge 3 encapsulates an SRv4-GRE tunnel header based on encapsulation information of the TVC 3-2.

Implementation (2): The intermediate node edge 3 performs conversion from an SRv4 tunnel encapsulation format to an SRv6 tunnel encapsulation format. Specifically, if the intermediate node edge 3 receives the packet sent by the edge 2, the intermediate node edge 3 decapsulates an SRv4-

GRE tunnel header, and the intermediate node edge 3 obtains, from the SRH, the topmost SID (the SID 301) indicated by an SL field. The intermediate node edge 3 performs a query in a local SID table based on the SID 301, and finds that an endpoint behavior corresponding to the SID 301 is End.X-SD-WAN, and a sending tunnel corresponding to the SID 301 is the TVC 3-1. The intermediate node edge 3 encapsulates an SRv6 tunnel header based on encapsulation information of the TVC 3-1.

Instance 1 to Instance 3 describe how layer 3 (L3) VPNv4 traffic is carried on an SD-WAN SR tunnel. In embodiments of this application, a VPN service, for example, L3 VPNv6 or layer 2 VNP (L2 VPN), other than L3 VPNv4 can be further carried on an SD-WAN SR tunnel. The following uses Instance 4 to describe an implementation in which L3 VPNv6 traffic is carried on an SD-WAN SR tunnel, and uses Instance 5 to describe an implementation in which L2 VPN traffic is carried on an SD-WAN SR tunnel.

Instance 4

Figure 15:
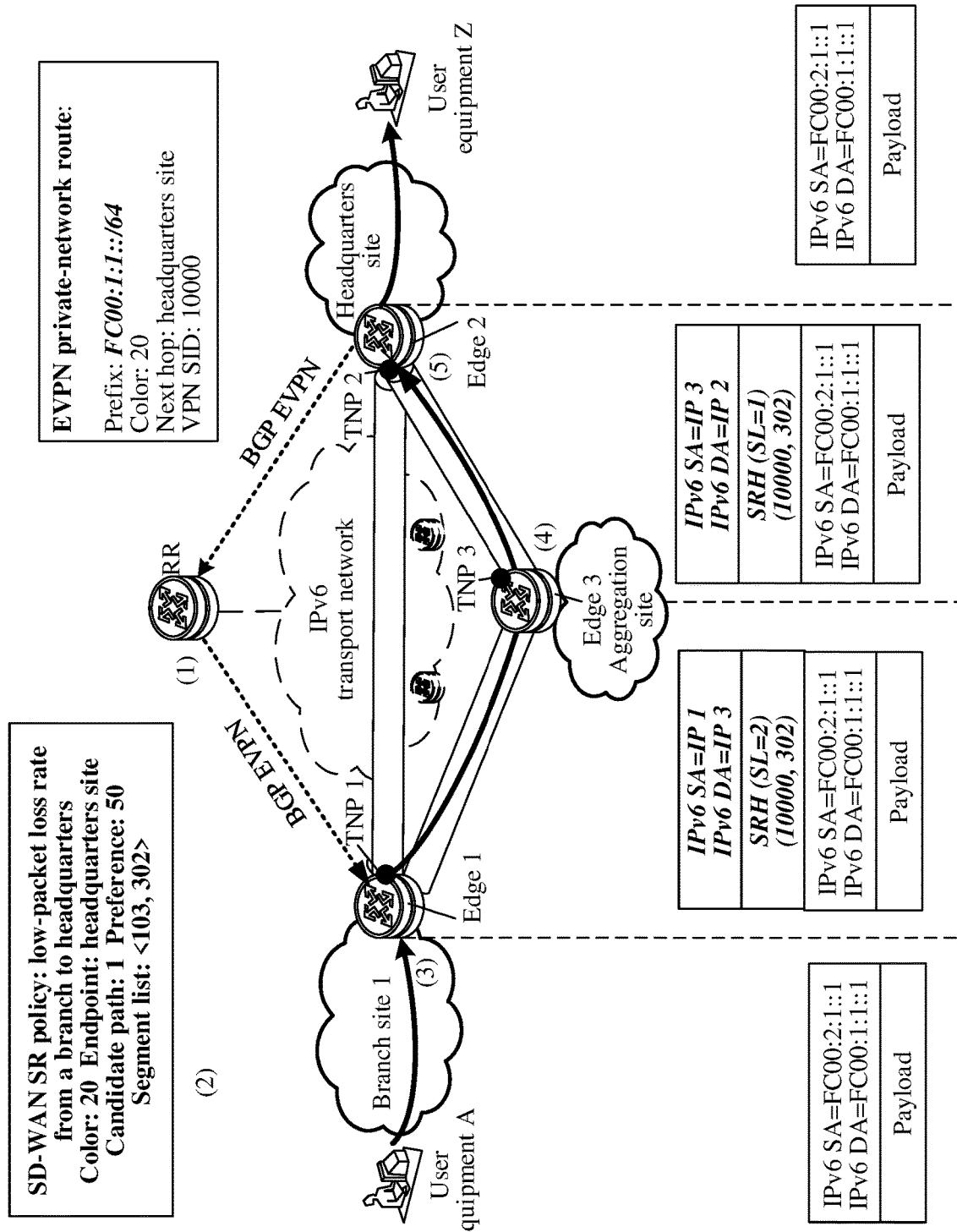
FIG. 15 is a schematic diagram of a method for forwarding L3 VPNv6 traffic by using an SD-WAN SR tunnel according to an embodiment of this application.

Instance 4 is a method for forwarding L3 VPNv6 traffic by using an SD-WAN SR tunnel provided in an embodiment of this application. FIG. 15 is a schematic diagram of Instance 4. As shown in FIG. 15, for a procedure of route advertisement on a control plane, a private-network route of an IPv6 user is transmitted by using a BGP EVPN on the basis of Instance 1. An SD-WAN SR tunnel is selected through iteration by using a color and a next hop in the private-network route of the IPv6 user. In this way, IPv6 L3 VPN traffic can be carried on an SD-WAN SR tunnel and forwarded. Specifically, as shown in FIG. 15, in step (1), an EVPN private-network route advertised by the edge 2 is an IPv6 route. A prefix carried in the EVPN private-network route is an IPv6 prefix, for example, FC00:1:1::/64. For a procedure of packet forwarding on a forwarding plane, a packet encapsulation format in an L3 VPNv6 scenario mainly differs from a packet encapsulation format in an L3 VPNv4 scenario in that an IP header of an inner-layer data packet is an IPv6 header. Specifically, as shown in FIG. 15, a data packet sent by a user A to the edge 1 is an IPv6 packet. An IP header in the data packet sent by the user A is an IPv6 header. A source address carried in the IP header in the data packet sent by the user A is an IPv6 address of the user A, for example, FC00:2:1::1. A destination address carried in the IP header in the data packet sent by the user A is an IPv6 address of a user Z, for example, FC00:1:1::1.

Instance 5

Figure 16:
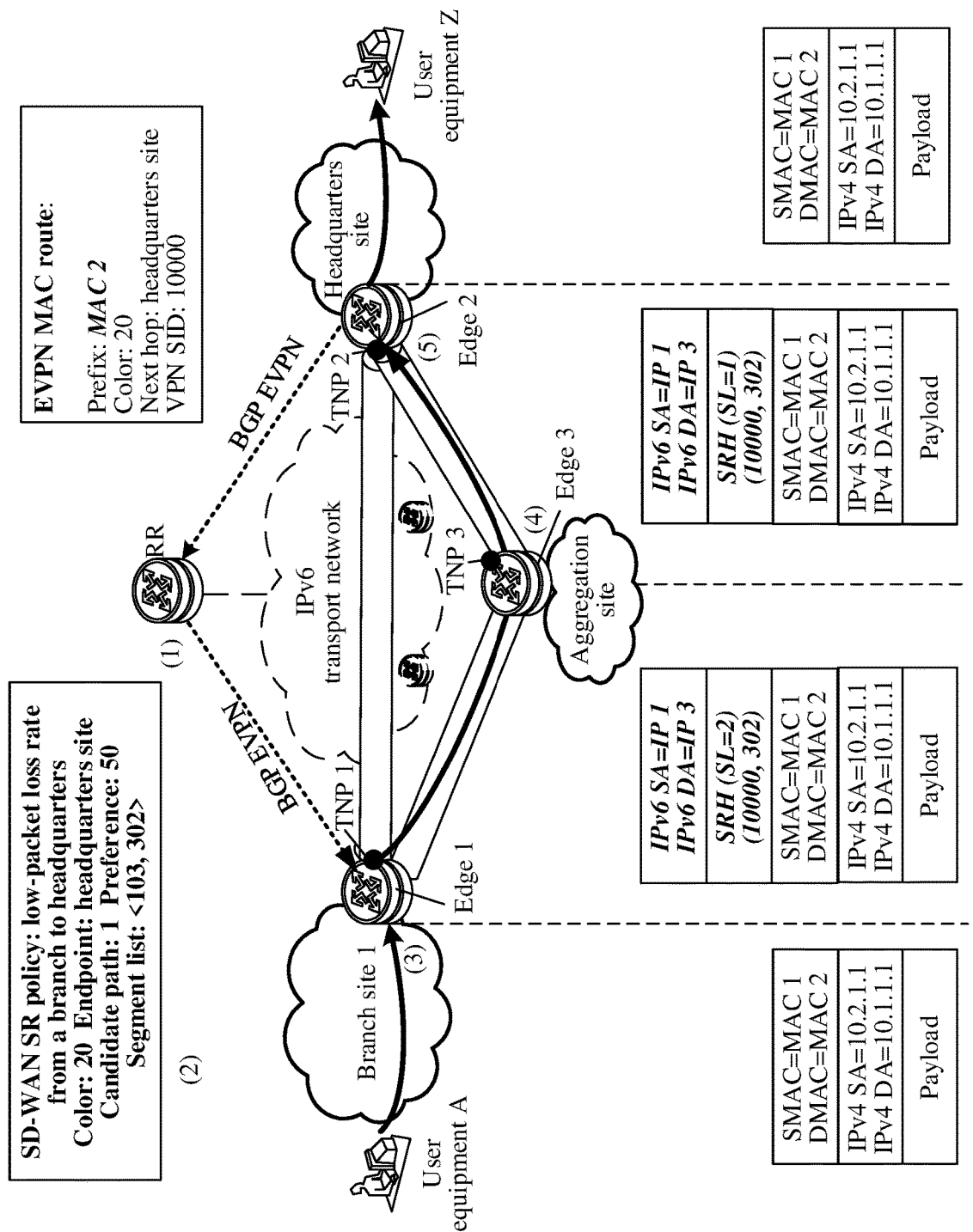
FIG. 16 is a schematic diagram of a method for forwarding L2 VPN traffic by using an SD-WAN SR tunnel according to an embodiment of this application.

Instance 5 is a method for forwarding L2 VPN traffic by using an SD-WAN SR tunnel provided in an embodiment of this application. FIG. 16 is a schematic diagram of Instance 5.

As shown in FIG. 16, on the basis of Instance 1, in step (1), an Ethernet auto-discovery (Ethernet AD) route, a MAC route advertisement route, an inclusive multicast route, an Ethernet segment (ES) route, or the like by using a BGP EVPN, and an SD-WAN SR tunnel is selected through iteration using a color and a next hop. In this way, L2 VPN traffic can be carried on the SD-WAN SR tunnel and forwarded. Specifically, as shown in FIG. 16, in step (1), an EVPN private-network route advertised by the edge 2 is an EVPN MAC route. A prefix carried in the EVPN private-network route advertised by the edge 2 includes a MAC address, for example, a MAC address (MAC 2) of a user Z. For a procedure of packet forwarding on a forwarding plane, a packet encapsulation format in an L2 VPN scenario mainly differs from a packet encapsulation format in an L3 VPN scenario in that an inner-layer data packet includes an Ethernet header and the inner-layer data packet and the Ethernet header are encapsulated into the tunnel as a whole.

It can be learned by summarizing the foregoing embodiments that beneficial effects brought by embodiments of this application include but are not limited to the following (1) to (3).

(1) In an SR tunneling technology provided in the embodiments, only an underlay network needs to provide WAN link IP route reachability, and an underlay network device does not need to run an IGP protocol that supports SR-MPLS or an IGP protocol that supports SRv6. The underlay network is decoupled from an overlay network, protocol deployment is simple, and this can adapt to various types of transport networks. For example, an overlay SR tunnel can be established in an IP public network, for example, the internet.

Figure 17:
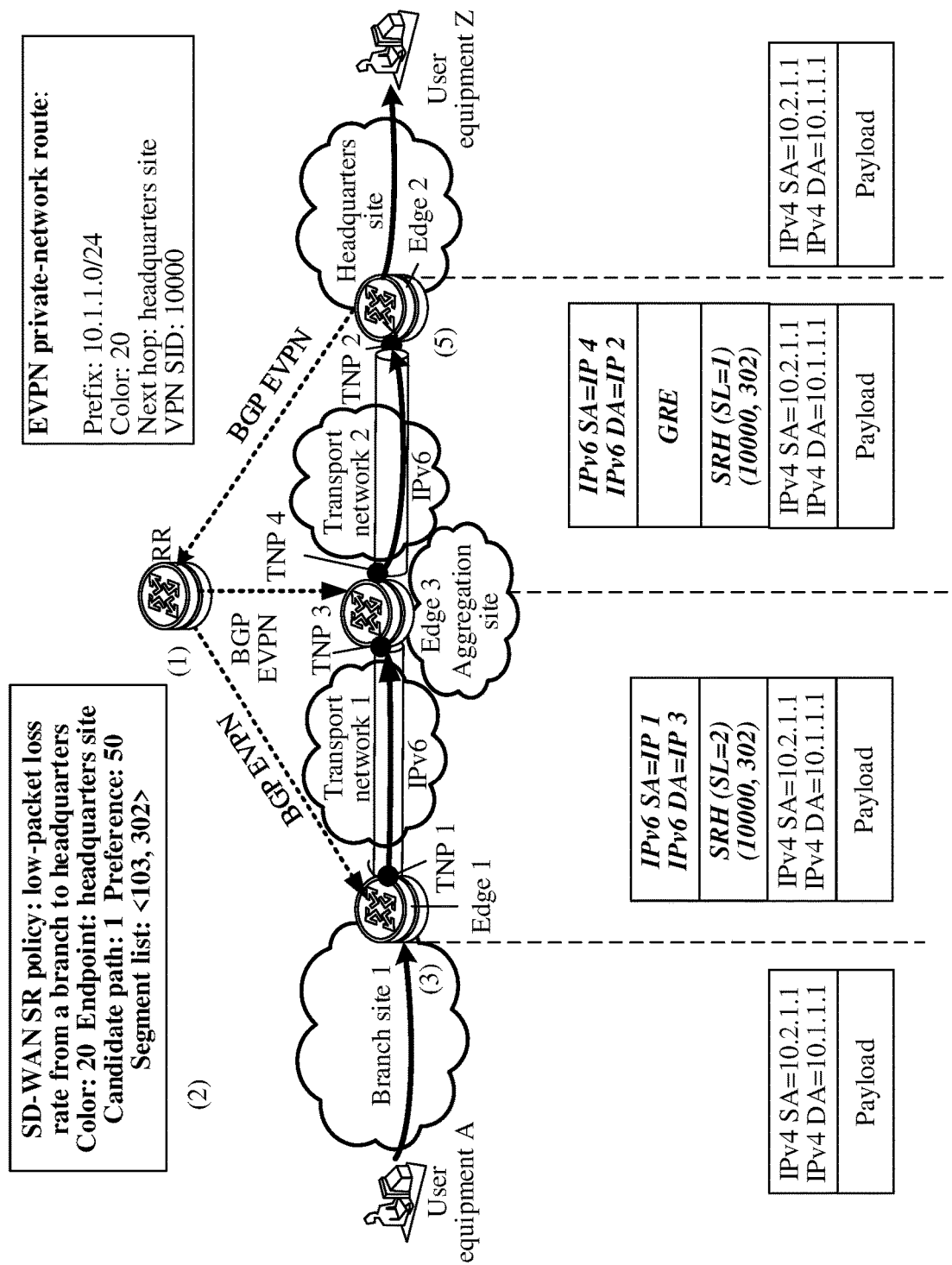
FIG. 17 is a schematic diagram of implementing multi-domain forwarding by using SD-WAN SR according to an embodiment of this application.

(2) In an existing SRv6 tunneling technology, a source IP address in an outer-layer IP header is specified on a head end device, and the source IP address does not change during forwarding by an intermediate network. If a tunnel needs to cross underlay transport networks in different routing domains, a packet may be discarded because URPF check fails. FIG. 17 is a schematic diagram of forwarding an SR packet across a plurality of domains in an SD-WAN network. As shown in FIG. 17, an intermediate node edge 3 is connected to an edge 1 through a transport network 1, and is connected to an edge 2 through a transport network 2. The intermediate node edge 3 receives a packet sent by the edge 1, where a source IP address of the packet is IP 1 (an IP address of a TNP 1 on the edge 1). If the intermediate node edge 3 keeps the source IP address of the packet unchanged, in other words, a source IP address of a packet sent by the intermediate node edge 3 to the edge 2 is still IP 1, when the packet arrives at the transport network 2 between the edge 3 and the edge 2, URPF check of the packet fails because a network device in the transport network 2 cannot find a route of IP 1, and therefore, the network device in the transport network 2 discards the packet. However, in the embodiments, because the intermediate node re-changes a source IP address of an SR tunnel packet based on information about each TVC, a problem of cross-domain tunnel URPF check is resolved. For example, as shown in FIG. 17, a source IP address of a packet received by the intermediate node edge 3 is IP 1, and a source IP address of a packet sent by the intermediate node edge 3 is updated to IP 4 (an address of a TNP 4 on the intermediate node edge 3).

(3) In the existing SRv6 tunneling technology, a tunnel can be established only on a transport network that supports IPv6 route forwarding. However, an SD-WAN SR tunnel in the embodiments is irrelevant to an underlay underlay transport network protocol, and therefore, both a case in which an underlay network is an IPv6 network and a case in which an underlay network is an IPv4 network can be supported, and even an end-to-end SR tunnel can be established across an IPv4 and IPv6 heterogeneous transport network.

In conclusion, in the SD-WAN SR tunneling method provided in the embodiments, only a related SD-WAN edge device needs to support necessary protocols such as BGP EVPN, BGP LS, and BGP SR protocols, the underlay network is considered as a black-box IP forwarding network as a whole, and a device in the underlay network does not need to run an additional IGP for SR extended protocol, for example, OSPFv3/ISISv6, for establishing SR. Therefore, the method provided in the embodiments may be referred to as an underlay transport network protocol-independent overlay SR method.

Figure 18:
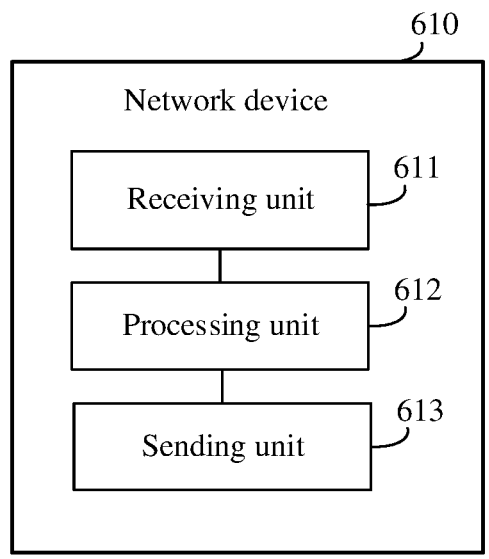
FIG. 18 is a schematic diagram of a structure of a network device according to an embodiment of this application.

FIG. 18 is a schematic diagram of a structure of a network device 610 according to an embodiment of this application. The network device 610 includes a receiving unit 611, a processing unit 612, and a sending unit 613.

Optionally, with reference to the application scenario shown in FIG. 1, the network device 610 shown in FIG. 18 is the network device 202 or the network device 204 in FIG. 1.

Optionally, with reference to the application scenario shown in FIG. 2, the network device 610 shown in FIG. 18 is the edge device 406 in FIG. 2.

Optionally, with reference to the application scenario shown in FIG. 3, the network device 610 shown in FIG. 18 is the POP GW 502 in FIG. 3.

Optionally, with reference to FIG. 4, the network device 610 shown in FIG. 18 is the network device b in the method procedure shown in FIG. 4. The receiving unit 611 is configured to support the network device 610 in performing S602. The processing unit 612 is configured to support the network device 610 in performing S603. The sending unit 613 is configured to support the network device 610 in performing S604.

Optionally, with reference to FIG. 7, the network device 610 shown in FIG. 18 is the edge 3 in FIG. 7.

Optionally, with reference to FIG. 8, the network device 610 shown in FIG. 18 is the edge 3 in FIG. 8.

Optionally, with reference to FIG. 9, the network device 610 shown in FIG. 18 is the edge 3 in FIG. 9.

Optionally, with reference to FIG. 10, the network device 610 shown in FIG. 18 is the edge 3 in FIG. 10.

Figure 11:
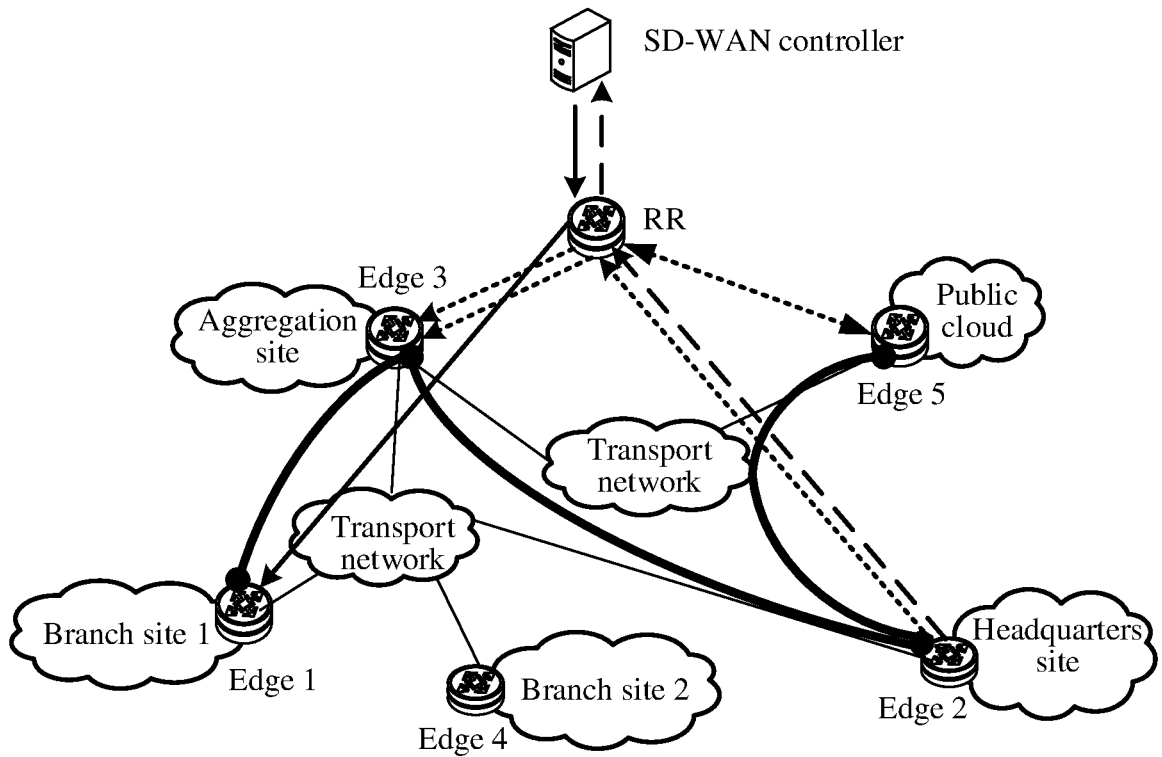
FIG. 11 is a schematic diagram of a system architecture of an SD-WAN according to an embodiment of this application.

Optionally, with reference to FIG. 11, the network device 610 shown in FIG. 18 is the edge 3 in FIG. 11.

Optionally, with reference to FIG. 12, the network device 610 shown in FIG. 18 is the edge 3 in FIG. 12.

Optionally, with reference to FIG. 13, the network device 610 shown in FIG. 18 is the edge 3 in FIG. 13.

Optionally, with reference to FIG. 14, the network device 610 shown in FIG. 18 is the edge 3 in FIG. 14.

Optionally, with reference to FIG. 15, the network device 610 shown in FIG. 18 is the edge 3 in FIG. 15.

Optionally, with reference to FIG. 16, the network device 610 shown in FIG. 18 is the edge 3 in FIG. 16.

The apparatus embodiment described in FIG. 18 is merely an example. For example, the unit division is merely logical function division, and there may be another division manner in actual implementation. For example, a plurality of units or components may be combined or integrated into another system, or some features may be ignored or not performed. Functional units in embodiments of this application may be integrated into one processing unit, or each unit may exist alone physically, or two or more units may be integrated into one unit.

All or some of the units in the network device 610 are implemented by using software, hardware, firmware, or any combination thereof.

Figure 20:
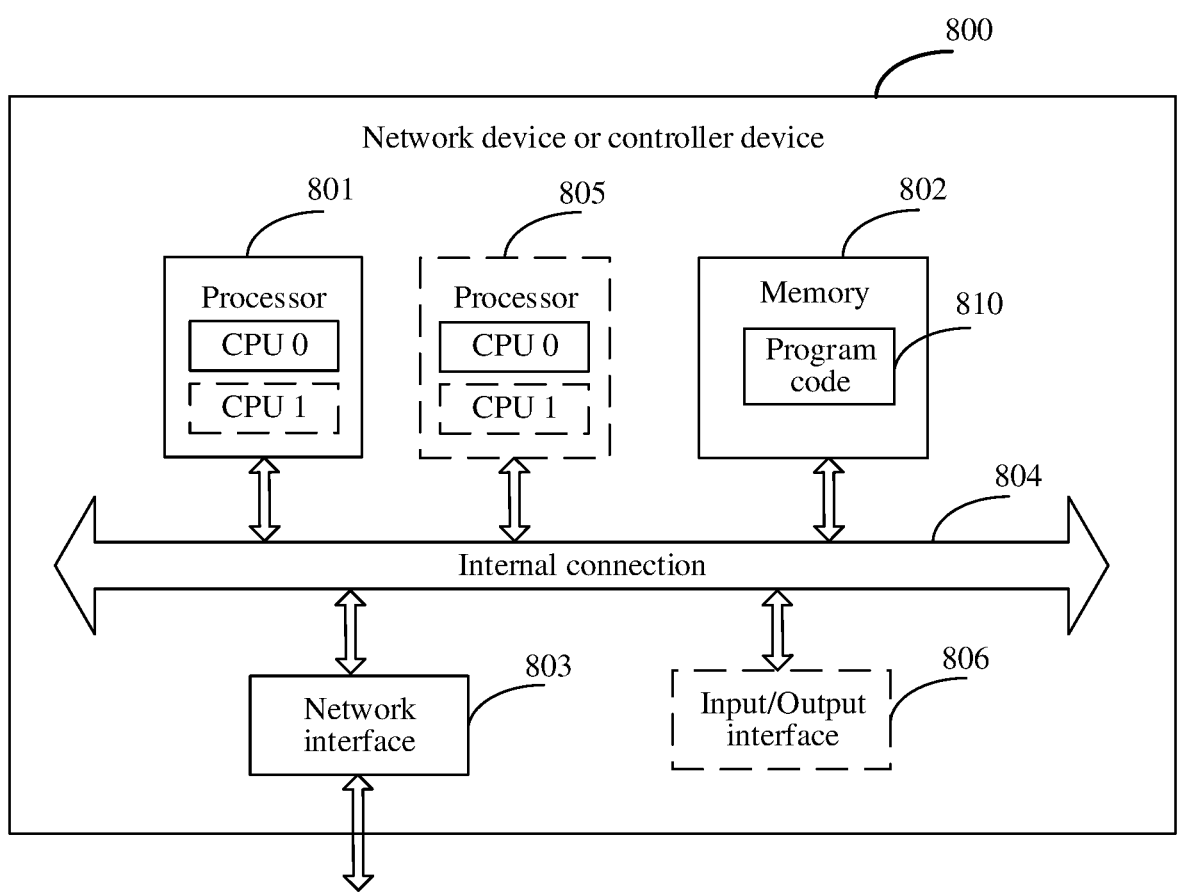
FIG. 20 is a schematic diagram of a structure of a network device or a controller device according to an embodiment of this application.

When software is used for implementation, for example, the processing unit 612 is implemented by a software functional unit generated by at least one processor 801 in FIG. 20 by reading program code stored in a memory 802. For another example, the processing unit 612 is implemented by a software functional unit generated by a central processing unit 911 on a main control board 910 in FIG. 21 by reading program code stored in a memory 912.

When hardware is used for implementation, for example, the foregoing units in FIG. 18 are separately implemented by different hardware in a network device. For example, the processing unit 612 is implemented by some processing resources (for example, one core or two cores in a multi-core processor) in at least one processor 801 in FIG. 20. Alternatively, the processing unit 612 is implemented by a programmable device such as a field-programmable gate array (field-programmable gate array, FPGA) or a coprocessor. For example, the receiving unit 611 and the sending unit 613 are implemented by a network interface 803 in FIG. 20. For another example, the receiving unit 611 and the sending unit 613 are implemented by a physical interface card 933 in FIG. 21.

Figure 19:
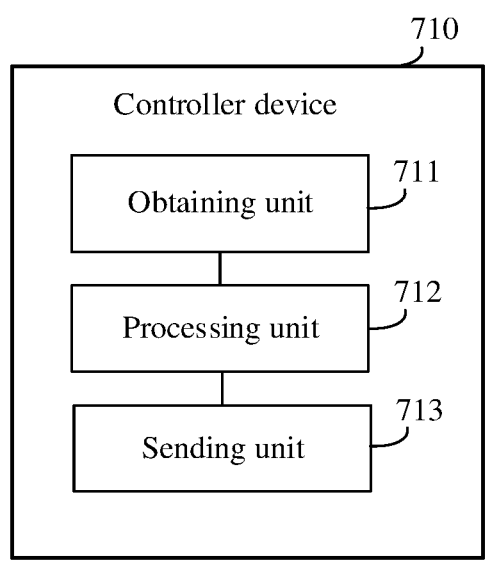
FIG. 19 is a schematic diagram of a structure of a controller device according to an embodiment of this application.

FIG. 19 is a schematic diagram of a structure of a controller device 710 according to an embodiment of this application. The controller device 710 includes an obtaining unit 711, a processing unit 712, and a sending unit 713.

Optionally, with reference to the application scenario shown in FIG. 1, the controller device 710 shown in FIG. 19 is the controller device 11 in FIG. 1.

Optionally, with reference to the application scenario shown in FIG. 2, the controller device 710 shown in FIG. 19 is the SD-WAN controller 490 in FIG. 2.

Optionally, with reference to the application scenario shown in FIG. 3, the controller device 710 shown in FIG. 19 is the SD-WAN controller 590 in FIG. 3.

Optionally, with reference to FIG. 6, the controller device 710 shown in FIG. 19 is the controller device in the method procedure shown in FIG. 6. The obtaining unit 711 is configured to support the controller device 710 in performing S702. The processing unit 712 is configured to support the controller device 710 in performing S703. The sending unit 713 is configured to support the controller device 710 in performing S704.

Optionally, with reference to FIG. 7, the controller device 710 shown in FIG. 19 is the SD-WAN controller in FIG. 7.

Optionally, with reference to FIG. 9, the controller device 710 shown in FIG. 19 is the SD-WAN controller in FIG. 9.

Optionally, with reference to FIG. 10, the controller device 710 shown in FIG. 19 is the SD-WAN controller in FIG. 10.

Optionally, with reference to FIG. 11, the controller device 710 shown in FIG. 19 is the SD-WAN controller in FIG. 11.

The apparatus embodiment described in FIG. 19 is merely an example. For example, the unit division is merely logical function division, and there may be another division manner in actual implementation. For example, a plurality of units or components may be combined or integrated into another system, or some features may be ignored or not performed. Functional units in embodiments of this application may be integrated into one processing unit, or each unit may exist alone physically, or two or more units may be integrated into one unit.

All or some of the units in the controller device 710 are implemented by using software, hardware, firmware, or any combination thereof.

When software is used for implementation, for example, the processing unit 712 is implemented by a software functional unit generated by at least one processor 801 in FIG. 20 by reading program code stored in a memory 802.

When hardware is used for implementation, for example, the foregoing units in FIG. 19 are separately implemented by different hardware in a controller device. For example, the processing unit 712 is implemented by some processing resources (for example, one core or two cores in a multi-core processor) in at least one processor 801 in FIG. 20. Alternatively, the processing unit 712 is implemented by a programmable device such as a field-programmable gate array (FPGA) or a coprocessor. For example, the obtaining unit 711 and the sending unit 713 are implemented by a network interface 803 in FIG. 20. For another example, the obtaining unit 711 and the sending unit 713 are implemented by a physical interface card 933 in FIG. 21.

The following describes basic hardware structures of the network device and the controller device by using examples.

FIG. 20 is a schematic diagram of a structure of a device 800 according to an embodiment of this application. The device 800 shown in FIG. 20 may be provided as a network device or a controller device. The device 800 includes at least one processor 801, a memory 802, and at least one network interface 803.

Optionally, with reference to the application scenario shown in FIG. 1, the device 800 shown in FIG. 20 is the network device 202, the network device 204, or the controller device 11 in FIG. 1.

Optionally, with reference to the application scenario shown in FIG. 2, the device 800 shown in FIG. 20 is the edge device 406 or the SD-WAN controller 490 in FIG. 2.

Optionally, with reference to the application scenario shown in FIG. 3, the device 800 shown in FIG. 20 is the POP GW 502 or the SD-WAN controller 590 in FIG. 3.

Optionally, with reference to FIG. 4, the device 800 shown in FIG. 20 is the network device b in the method procedure shown in FIG. 4. The network interface 803 is configured to support the device 800 in performing S602 and S604. The processor 801 is configured to support the device 800 in performing S603.

Optionally, with reference to FIG. 6, the device 800 shown in FIG. 20 is the SD-WAN controller in the method procedure shown in FIG. 6. The network interface 803 is configured to support the device 800 in performing S702 and S704. The processor 801 is configured to support the device 800 in performing S703.

Optionally, with reference to FIG. 7, the device 800 shown in FIG. 20 is the edge 3 or the SD-WAN controller in FIG. 7.

Optionally, with reference to FIG. 8, the device 800 shown in FIG. 20 is the edge 3 in FIG. 8.

Optionally, with reference to FIG. 9, the device 800 shown in FIG. 20 is the edge 3 or the SD-WAN controller in FIG. 9.

Optionally, with reference to FIG. 10, the device 800 shown in FIG. 20 is the edge 3 or the SD-WAN controller in FIG. 10.

Optionally, with reference to FIG. 11, the device 800 shown in FIG. 20 is the edge 3 or the SD-WAN controller in FIG. 11.

Optionally, with reference to FIG. 12, the device 800 shown in FIG. 20 is the edge 3 in FIG. 12.

Optionally, with reference to FIG. 13, the device 800 shown in FIG. 20 is the edge 3 in FIG. 13.

Optionally, with reference to FIG. 14, the device 800 shown in FIG. 20 is the edge 3 in FIG. 14.

Optionally, with reference to FIG. 15, the device 800 shown in FIG. 20 is the edge 3 in FIG. 15.

Optionally, with reference to FIG. 16, the device 800 shown in FIG. 20 is the edge 3 in FIG. 16.

The processor 801 is, for example, a general-purpose central processing unit (CPU), a network processor (NP), a graphics processing unit (GPU), a neural-network processing unit (NPU), a data processing unit (DPU), a microprocessor, or one or more integrated circuits configured to implement the solutions in this application. For example, the processor 801 includes an application-specific integrated circuit (ASIC), a programmable logic device (PLD), or a combination thereof. The PLD is, for example, a complex programmable logic device (CPLD), a field-programmable gate array (FPGA), a generic array logic (GAL), or any combination thereof.

The memory 802 is, for example, a read-only memory (ROM) or another type of static storage device capable of storing static information and instructions, or a random access memory (RAM) or another type of dynamic storage device capable of storing information and instructions, or an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. Optionally, the memory 802 exists independently, and is connected to the processor 801 through an internal connection 804. Alternatively, optionally, the memory 802 and the processor 801 are integrated together.

The network interface 803 is any apparatus such as a transceiver, and is configured to communicate with another device or a communication network. For example, the network interface 803 includes at least one of a wired network interface or a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

In some embodiments, the processor 801 includes one or more CPUs such as a CPU 0 and a CPU 1 shown in FIG. 20.

In some embodiments, the device 800 optionally includes a plurality of processors such as the processor 801 and a processor 805 shown in FIG. 20. Each of these processors is, for example, a single-core processor (single-CPU) or a multi-core processor (multi-CPU). Optionally, the processor herein is one or more devices, circuits, and/or processing cores configured to process data (for example, a computer program instruction).

In some embodiments, the device 800 further includes the internal connection 804. The processor 801, the memory 802, and the at least one network interface 803 are connected through the internal connection 804. The internal connection 804 includes a path for transmitting information between the foregoing components. Optionally, the internal connection 804 is a board or a bus. Optionally, the internal connection 804 is classified into an address bus, a data bus, a control bus, and the like.

In some embodiments, the device 800 further includes an input/output interface 806. The input/output interface 806 is connected to the internal connection 804.

Optionally, the processor 801 implements the method in the foregoing embodiment by reading program code 810 stored in the memory 802, or the processor 801 implements the method in the foregoing embodiment by using internally stored program code. When the processor 801 implements the method in the foregoing embodiment by reading the program code 810 stored in the memory 802, the memory 802 stores program code for implementing the method provided in embodiments of this application.

For more details about how the processor 801 implements the foregoing functions, refer to descriptions in the foregoing method embodiments. Details are not repeated herein.

Figure 21:
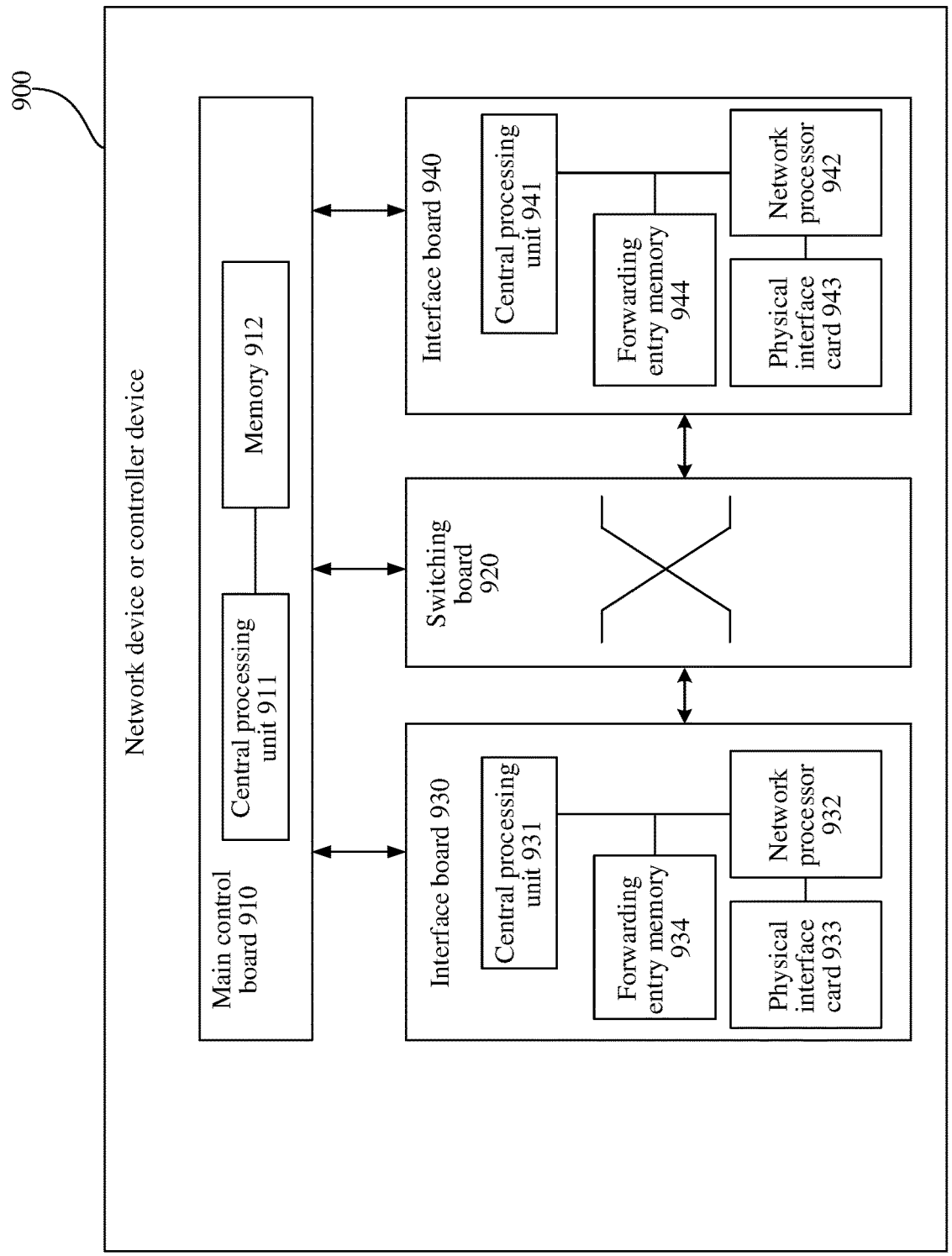
FIG. 21 is a schematic diagram of a structure of a network device or a controller device according to an embodiment of this application.

FIG. 21 is a schematic diagram of a structure of a device 900 according to an embodiment of this application. The device 900 shown in FIG. 21 may be provided as a network device or a controller device. The device 900 includes a main control board 910 and an interface board 930.

Optionally, with reference to the application scenario shown in FIG. 1, the device 900 shown in FIG. 21 is the network device 202, the network device 204, or the controller device 11 in FIG. 1.

Optionally, with reference to the application scenario shown in FIG. 2, the device 900 shown in FIG. 21 is the edge device 406 or the SD-WAN controller 490 in FIG. 2.

Optionally, with reference to the application scenario shown in FIG. 3, the device 900 shown in FIG. 21 is the POP GW 502 or the SD-WAN controller 590 in FIG. 3.

Optionally, with reference to FIG. 4, the device 900 shown in FIG. 21 is the network device b in the method procedure shown in FIG. 4. A physical interface card 933 on the interface board 930 is configured to support the device 800 in performing S602 and S604. A network processor 932 on the interface board 930 and a central processing unit 911 on the main control board 910 are configured to support the device 800 in performing S603.

Optionally, with reference to FIG. 6, the device 900 shown in FIG. 21 is the SD-WAN controller in the method procedure shown in FIG. 6. A physical interface card 933 on the interface board 930 is configured to support the device 800 in performing S702 and S704. A central processing unit 911 on the main control board 910 is configured to support the device 800 in performing S703.

Optionally, with reference to FIG. 7, the device 900 shown in FIG. 21 is the edge 3 or the SD-WAN controller in FIG. 7.

Optionally, with reference to FIG. 8, the device 900 shown in FIG. 21 is the edge 3 in FIG. 8.

Optionally, with reference to FIG. 9, the device 900 shown in FIG. 21 is the edge 3 or the SD-WAN controller in FIG. 9.

Optionally, with reference to FIG. 10, the device 900 shown in FIG. 21 is the edge 3 or the SD-WAN controller in FIG. 10.

Optionally, with reference to FIG. 11, the device 900 shown in FIG. 21 is the edge 3 or the SD-WAN controller in FIG. 11.

Optionally, with reference to FIG. 12, the device 900 shown in FIG. 21 is the edge 3 in FIG. 12.

Optionally, with reference to FIG. 13, the device 900 shown in FIG. 21 is the edge 3 in FIG. 13.

Optionally, with reference to FIG. 14, the device 900 shown in FIG. 21 is the edge 3 in FIG. 14.

Optionally, with reference to FIG. 15, the device 900 shown in FIG. 21 is the edge 3 in FIG. 15.

Optionally, with reference to FIG. 16, the device 900 shown in FIG. 21 is the edge 3 in FIG. 16.

The main control board is also referred to as a main processing unit (MPU) or a route processor card. The main control board 910 is configured to control and manage the components in the device 900, including functions of route calculation, device management, device maintenance, and protocol processing. The main control board 910 includes the central processing unit 911 and a memory 912.

The interface board 930 is also referred to as a line processing unit (LPU), a line card, or a service board. The interface board 930 is configured to provide various service interfaces, and implement data packet forwarding. The service interface includes but is not limited to an Ethernet interface, a POS (packet over SONET/SDH) interface, and the like. The Ethernet interface is, for example, a flexible Ethernet service interface (flexible Ethernet clients, FlexE clients). The interface board 930 includes a central processing unit 931, the network processor 932, a forwarding entry memory 934, and the physical interface card (PIC) 933.

The central processing unit 931 on the interface board 930 is configured to control and manage the interface board 930 and communicate with the central processing unit 911 on the main control board 910.

The network processor 932 is configured to implement packet forwarding processing. A form of the network processor 932 is, for example, a forwarding chip. Specifically, the network processor 932 is configured to: forward a received packet based on a forwarding table stored in the forwarding entry memory 934, and if a destination address of the packet is an address of the device 900, send the packet to a CPU (for example, the central processing unit 911) for processing, or if the destination address of the packet is not the address of the device 900, find, in the forwarding table based on the destination address, a next hop and an outbound interface that correspond to the destination address, and forward the packet to the outbound interface corresponding to the destination address. Processing an upstream packet includes processing an inbound interface of the packet and searching a forwarding table. Processing a downstream packet is searching a forwarding table and the like.

The physical interface card 933 is configured to implement a physical layer interconnection function, so that original traffic enters the interface board 930 through the physical interface card 933, and a processed packet is sent out from the physical interface card 933. The physical interface card 933 is also referred to as a sub-card, may be installed on the interface board 930, and is responsible for converting an optical/electrical signal into a packet, performing validity check on the packet, and forwarding the packet to the network processor 932 for processing. In some embodiments, the central processing unit may alternatively perform a function of the network processor 932, for example, implement software forwarding based on a general-purpose CPU, and therefore, the network processor 932 is not required in the physical interface card 933.

Optionally, the device 900 includes a plurality of interface boards. For example, the device 900 further includes an interface board 940, and the interface board 940 includes a central processing unit 941, a network processor 942, a forwarding entry memory 944, and a physical interface card 943.

Optionally, the device 900 further includes a switching board 920. The switching board 920 is also referred to as a switch fabric unit (SFU), for example. When the network device has a plurality of interface boards 930, the switching board 920 is configured to complete data exchange between the interface boards. For example, the interface board 930 and the interface board 940 communicate with each other through the switching board 920, for example.

The main control board 910 and the interface board 930 are coupled. For example, the main control board 910, the interface board 930, the interface board 940, and the switching board 920 are connected to a system backplane through a system bus to implement interworking. In a possible implementation, an inter-process communication (IPC) channel is established between the main control board 910 and the interface board 930, and communication is performed between the main control board 910 and the interface board 930 by using the IPC channel.

Logically, the device 900 includes a control plane and a forwarding plane. The control plane includes the main control board 910 and the central processing unit 931, and the forwarding plane includes components that perform forwarding, for example, the forwarding entry memory 934, the physical interface card 933, and the network processor 932. The control plane performs a function of a router, functions of generating a forwarding table, processing signaling and a protocol packet, and configuring and maintaining a device status, and the like. The control plane delivers a generated forwarding table to the forwarding plane. On the forwarding plane, the network processor 932 performs, based on the forwarding table delivered by the control plane, table searching and forwarding on a packet received by the physical interface card 933. The forwarding table delivered by the control plane is stored, for example, in the forwarding entry memory 934. In some embodiments, for example, the control plane and the forwarding plane are completely separated and are not on a same device.

Operations on the interface board 940 are consistent with operations on the interface board 930. For brevity, the operations on the interface board 940 are not described.

The device 900 in this embodiment may correspond to the network device or the controller device in the foregoing method embodiments, and the main control board 910 and the interface board 930 and/or the interface board 940 in the device 900 implement, for example, functions of the network device or the controller device in the foregoing method embodiments and/or steps implemented by the network device or the controller device in the foregoing method embodiments. For brevity, details are not described herein again.

It should be noted that there may be one or more main control boards, and when there are a plurality of main control boards, for example, the plurality of main control boards include an active main control board and a standby main control board. There may be one or more interface boards, and a network device having a stronger data processing capability provides more interface boards. There may also be one or more physical interface cards on the interface board. There may be no switching board, or there may be one or more switching boards. If there are a plurality of switching boards, the switching boards can jointly implement load sharing and redundancy backup. In a centralized forwarding architecture, a network device may not need the switching board, and the interface board undertakes a function of processing service data in an entire system. In a distributed forwarding architecture, a network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, a form of the network device may have only one card, in other words, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. A device in this form (for example, a network device such as a low-end switch or a router) has a relatively weak data exchange and processing capability. A specific architecture that is to be used depends on a specific networking deployment scenario. This is not limited herein.

The embodiments in this specification are described in a progressive way. For same or similar parts of the embodiments, refer to each other. Each embodiment focuses on a difference from other embodiments.

As used herein, the term "and/or" refers to and covers any and all possible combinations of one or more of the associated listed items. The term "and/or" describes an association relationship between associated objects, and represents that three relationships may exist. For example, A and/or B may represent the following three cases: Only A exists, both A and B exist, and only B exists. In addition, the character "/" in this application usually indicates an "or" relationship between the associated objects.

That A refers to B means that A is the same as B or A is a simple variation of B. The terms "first", "second", and the like in the specification and claims of embodiments of this application are used to distinguish between different objects, but are not used to describe a specific order of the objects, and cannot be understood as indicating or implying relative importance. For example, a first connection and a second connection are used to distinguish between different connections, but are not used to describe a specific order of the connections, and cannot mean that the first connection is more important than the second connection.

In embodiments of this application, unless otherwise specified, "at least one" means one or more, and "a plurality of" means two or more. For example, "a plurality of connections" refers to two or more connections.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing embodiments are merely used to describe the technical solutions of this application, but are not intended to limit the technical solutions. Although this application is described in detail with reference to the foregoing embodiments, persons of ordinary skill in the art should understand that they may still make modifications to the technical solutions described in the foregoing embodiments or make equivalent replacements to some technical features thereof, but the essence of the corresponding technical solutions does not depart from the scope of the technical solutions of embodiments of this application.

What is claimed is:

1. A packet processing method comprising:
receiving, by a first network device, a first packet from a second network device,
wherein an internet protocol (IP) address of the first packet comprises an endpoint IP address of a first connection,
wherein the first packet comprises a segment identifier (SID) that indicates a second connection, and
wherein the first connection is a connection from the second network device to the first network device, and the second connection is a connection from the first network device to a third network device;
performing, by the first network device, endpoint behaviors associated with the SID on the first packet to obtain a second packet,
wherein a source IP address of the second packet is an IP address that belongs to the first network device in an endpoint IP address of the second connection, and
wherein a destination IP address of the second packet is an IP address that belongs to the third network device in the endpoint IP address of the second connection; and
sending, by the first network device, the second packet to the third network device.

2. The method according to claim 1, wherein the endpoint IP address of the first connection is an internet protocol version 6 (IPv6) address, the first packet comprises a segment routing header (SRH), and the SID is located in the SRH.

3. The method according to claim 1, wherein the endpoint IP address of the first connection is an internet protocol version 4 (IPv4) address, the first packet comprises a segment routing header (SRH), and the SID is located in the SRH.

4. The method according to claim 3, wherein the endpoint IP address of the first connection is located in an IPv4 header of the first packet, wherein the first packet comprises a protocol type associated with the SRH, and
wherein the protocol type is located in a generic routing encapsulation (GRE) header of the first packet, or the protocol type is located in a virtual extensible local area network (VXLAN) header of the first packet, or the protocol type is located in the IPv4 header of the first packet.

5. The method according to claim 1, wherein the endpoint IP address of the second connection is an internet protocol version 6 (IPv6) address or an internet protocol version 4 (IPv4) address.

6. The method according to claim 1, wherein the endpoint IP address of the first connection and/or the endpoint IP address of the second connection each are/is an IP address that is of a wide area network (WAN) interface and that is assigned by an operator of an underlay network.

7. The method according to claim 1, wherein the first connection and/or the second connection each are/is a connection between different sites.

8. The method according to claim 1, wherein before receiving, by the first network device, the first packet from the second network device, the method further comprises:
sending, by the first network device, the endpoint IP address of the second connection and/or the endpoint IP address of the first connection to a controller device.

9. The method according to claim 8, wherein sending, by the first network device, the endpoint IP address of the second connection and/or the endpoint IP address of the first connection to the controller device comprises:
generating, by the first network device, a border gateway protocol-link state (BGP-LS) packet that comprises the endpoint IP address of the second connection and/or the endpoint IP address of the first connection, and wherein the BGP-LS packet further comprises an identifier of a software-defined wide area network (SD-WAN) protocol; and
sending, by the first network device, the BGP-LS packet to the controller device.

10. The method according to claim 9, wherein before receiving, by the first network device, the first packet from the second network device, the method further comprises at least one of the following:
sending, by the first network device, an identifier of a site in which the first network device is located to the controller device; or
sending, by the first network device, a connectivity status of the first connection and/or a connectivity status of the second connection to the controller device; or
sending, by the first network device, service-level agreement (SLA) information of the first connection and/or the second connection to the controller device.

11. The method according to claim 1, wherein before receiving, by the first network device, the first packet from the second network device, the method further comprises receiving, by the first network device, the SID from the controller device.

12. The method according to claim 1, wherein the SID is an SID of an End.X-SD-WAN type.

13. A path determining method comprising:
obtaining, by a controller device, endpoint IP addresses of a plurality of connections;
determining, by the controller device, a segment routing (SR) path based on the endpoint IP addresses of the plurality of connections,
wherein the SR path comprises a first connection and a second connection in from the plurality of connections, and
wherein the first connection is a connection from a first network device to a second network device, and the second connection is a connection from the second network device to a third network device; and
sending, by the controller device, an SR policy to the first network device, wherein the SR policy indicates the SR path.

14. The method according to claim 13, wherein the SR policy comprises a first segment identifier (SID) that indicates the second connection.

15. The method according to claim 14, further comprising:
assigning, by the controller device, the first SID to the second connection, and assigning a second SID to the first connection,
wherein the first SID indicates the second connection, and the second SID indicates the first connection; and
sending, by the controller device, the first SID to the second network device, and sending the second SID to the first network device.

16. The method according to claim 13, wherein each of the plurality of connections is a connection between different sites, and determining, by the controller device, the SR path based on the endpoint IP addresses of the plurality of connections comprises:

determining, by the controller device, the SR path based on the endpoint IP addresses of the plurality of connections by using sites as path orchestration objects.

17. A network device that is a first network device, wherein the network device comprises:
a processor coupled to a memory,
the memory storing at least one computer program instruction and, which upon being executed by the processor, cause the network device to:
receive a first packet from a second network device,
wherein an internet protocol (IP) address of the first packet comprises an endpoint IP address of a first connection,
wherein the first packet comprises a segment identifier (SID) that indicates a second connection, and
wherein the first connection is a connection from the second network device to the first network device, and the second connection is a connection from the first network device to a third network device;
perform endpoint behaviors associated with the SID on the first packet to obtain a second packet,
wherein a source IP address of the second packet is an IP address that belongs to the first network device in an endpoint IP address of the second connection, and
wherein a destination IP address of the second packet is an IP address belonging to the third network device in the endpoint IP address of the second connection; and
send the second packet to the third network device.

18. The network device according to claim 17, wherein the at least one computer program instruction, upon being executed by the processor, further cause the network device to:
send the endpoint IP address of the second connection and/or the endpoint IP address of the first connection to a controller device.

19. The network device according to claim 18, wherein the at least one computer program instruction, upon being executed by the processor, further cause the network device to:
generate a border gateway protocol-link state (BGP-LS) packet that comprises the endpoint IP address of the second connection and/or the endpoint IP address of the first connection, and further comprises an identifier of a software-defined wide area network (SD-WAN) protocol; and
send the BGP-LS packet to the controller device.

20. The network device according to claim 17, wherein the at least one computer program instruction, upon being executed by the processor, further cause the network device to perform at least one of the following:
send an identifier of a site in which the first network device is located to the controller device; or
send a connectivity status of the first connection and/or a connectivity status of the second connection to the controller device; or
send service-level agreement (SLA) information of the first connection and/or the second connection to the controller device.

* * * * *